(12) United States Patent
Tschernjaew et al.

(10) Patent No.: US 9,199,211 B2
(45) Date of Patent: Dec. 1, 2015

(54) STORAGE-STABLE PRODUCT SYSTEMS FOR PREMIX FORMULATIONS

(75) Inventors: Juri Tschernjaew, Aschaffenburg (DE); Patrik Stenner, Hanau (DE); Wojciech Pisula, Mainz (DE); Claus-Peter Drexel, Neu-Isenburg (DE); Martina Gottheis, Langenselbold (DE); Tanja Seitz, Langenselbold (DE); Martin G. Hitzler, Tacherting (DE)

(73) Assignee: Evonik Degussa GmbH, Essen (DE)

( * ) Notice: Subject to any disclaimer, the term of this patent is extended or adjusted under 35 U.S.C. 154(b) by 720 days.

(21) Appl. No.: 12/867,493

(22) PCT Filed: Feb. 2, 2009

(86) PCT No.: PCT/EP2009/051137
§ 371 (c)(1),
(2), (4) Date: Sep. 30, 2010

(87) PCT Pub. No.: WO2009/100995
PCT Pub. Date: Aug. 20, 2009

(65) Prior Publication Data
US 2011/0037021 A1 Feb. 17, 2011

(30) Foreign Application Priority Data

Feb. 13, 2008 (DE) .......................... 10 2008 000 290

(51) Int. Cl.
*B01J 2/00* (2006.01)
*B01J 2/06* (2006.01)
*C09K 3/00* (2006.01)

(52) U.S. Cl.
CPC ... *B01J 2/006* (2013.01); *B01J 2/06* (2013.01)

(58) Field of Classification Search
CPC .................................... B01J 2/006; B01J 2/06
USPC ....... 252/182.13; 106/15.05; 264/4; 523/122; 424/49, 50, 51, 403
See application file for complete search history.

(56) References Cited

U.S. PATENT DOCUMENTS

| 4,053,851 A | 10/1977 | Krupke |
| 4,065,564 A | 12/1977 | Miles et al. |
| 4,073,880 A | 2/1978 | Pader et al. |
| 4,115,130 A | 9/1978 | Crump et al. |
| 4,223,070 A * | 9/1980 | Hahn et al. .................... 428/407 |

(Continued)

FOREIGN PATENT DOCUMENTS

| CA | 2438438 | 2/2005 |
| CH | 573212 | 3/1976 |

(Continued)

OTHER PUBLICATIONS

United States Patent Office Action for U.S. Appl. No. 12/850,775 dated Aug. 15, 2012 (16 pages).

(Continued)

*Primary Examiner* — Joseph D Anthony
(74) *Attorney, Agent, or Firm* — Michael Best & Friedrich LLP

(57) ABSTRACT

The present invention relates to storage-stable product systems having high latency and good mechanical stability, which are suitable, inter alia, for premix formulations. Furthermore, the present invention relates to a method for producing the formulations according to the invention and the use thereof.

32 Claims, 3 Drawing Sheets

XPS

Figure 3:
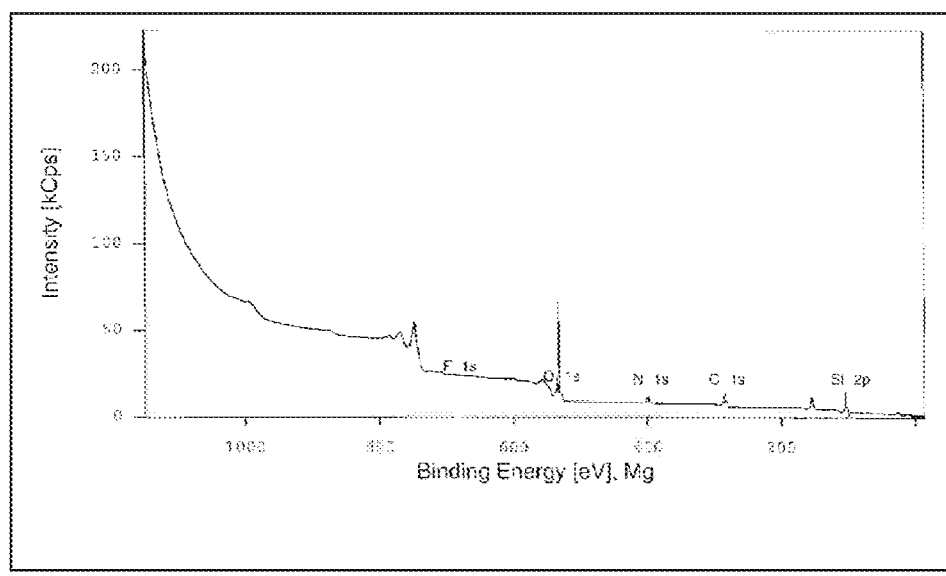

Principle of X-ray photoelectron spectrometry
XPS/ESCA

(56) References Cited

U.S. PATENT DOCUMENTS

| | | |
|---|---|---|
| 4,278,655 A | 7/1981 | Elmi |
| 4,414,005 A * | 11/1983 | De Bievre et al. ............... 95/127 |
| 5,084,440 A | 1/1992 | Baudin et al. |
| 5,500,138 A | 3/1996 | Bacon et al. |
| 5,776,240 A | 7/1998 | Deller et al. |
| 6,905,698 B1 | 6/2005 | Aldcroft et al. |
| 2001/0026802 A1 | 10/2001 | Price et al. |
| 2002/0103219 A1 | 8/2002 | Jacob |
| 2004/0047792 A1 | 3/2004 | Schubert et al. |
| 2007/0036843 A1 | 2/2007 | Hirsh et al. |
| 2007/0275068 A1 | 11/2007 | Martens et al. |
| 2010/0026802 A1 | 2/2010 | Titus et al. |
| 2011/0030578 A1 * | 2/2011 | Schulz et al. ............... 106/15.05 |
| 2011/0033511 A1 | 2/2011 | Pisula et al. |

FOREIGN PATENT DOCUMENTS

| | | |
|---|---|---|
| DE | 102008000290 | 8/2009 |
| DE | 102009028255 | 2/2011 |
| DE | 102009036767 | 2/2011 |
| EP | 0005302 | 11/1979 |
| EP | 0170386 | 12/1983 |
| EP | 0454881 | 11/1991 |
| EP | 0341383 | 6/1992 |
| EP | 0798348 | 12/1998 |
| EP | 0725037 | 3/2001 |
| EP | 1241135 | 9/2002 |
| EP | 0922671 | 10/2003 |
| EP | 1398301 | 9/2007 |
| GB | 2018590 | 7/1982 |
| WO | 97/29157 | 8/1997 |
| WO | 00/11949 | 3/2000 |
| WO | 00/51724 | 9/2000 |
| WO | 01/58416 | 8/2001 |
| WO | 02/098998 | 12/2002 |
| WO | 03/033027 | 4/2003 |
| WO | 03/082360 | 10/2003 |
| WO | 2004/072153 | 8/2004 |
| WO | 2005/012175 | 2/2005 |
| WO | 2006/004481 | 1/2006 |
| WO | 2006/111761 | 10/2006 |
| WO | 2007/024265 | 3/2007 |
| WO | 2007/030389 | 3/2007 |
| WO | 2007/048464 | 5/2007 |
| WO | 2008/013757 | 1/2008 |
| WO | 2008/025538 | 3/2008 |
| WO | 2009/100995 | 8/2009 |

OTHER PUBLICATIONS

United States Patent Office Action for U.S. Appl. No. 12/850,775 dated Mar. 6, 2013 (6 pages).
United States Patent Office Action for U.S. Appl. No. 12/851,623 dated Feb. 14, 2013 (13 pages).
Park, D.J. et al., "Controlled Release of Pesticides from Microparticles," Controlled-release Delivery Systems for Pesticides (H.B. Scher, editor), Marcel Dekker Inc., New York (1999) 89-136.
European Search Report for Application No. 10170359 dated Oct. 14, 2010 (6 pages).
International Preliminary Report on Patentability for Application No. PCT/EP2009/051137 dated Sep. 10, 2010 (9 pages).
Translation of International Preliminary Report on Patentability for Application No. PCT/EP2009/051137 dated Dec. 9, 2010 (10 pages).
International Search Report for Application No. PCT/EP2009/051137 dated Aug. 10, 2010 (5 pages).
United States Patent Office Action for U.S. Appl. No. 12/851,623 dated Nov. 7, 2013 (14 pages).

* cited by examiner

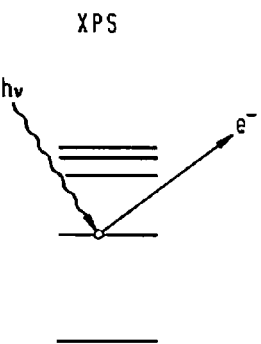
Figure 1: Principle of X-ray photoelectron spectrometry XPS/ESCA
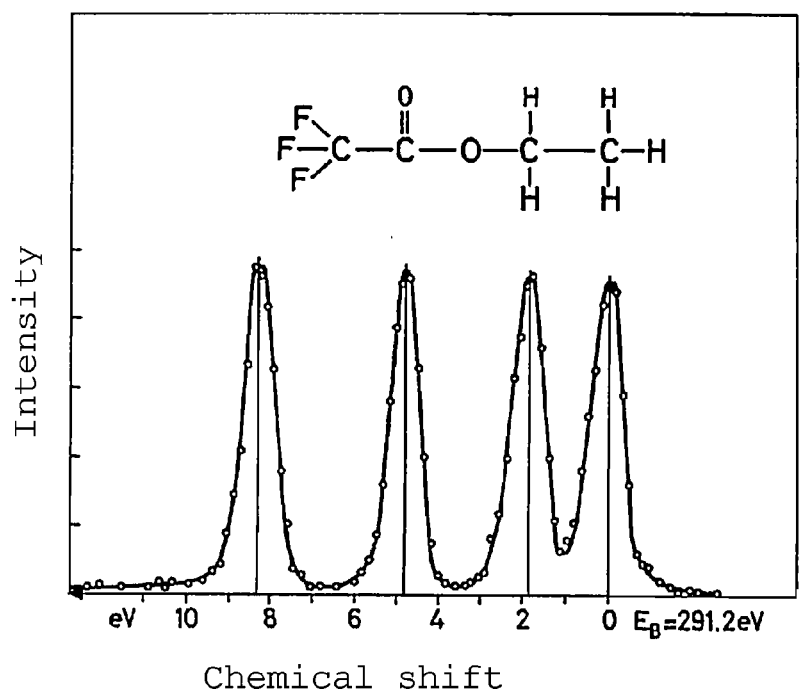
Figure 2: XPS/ESCA spectrum for trifluoroacetic acid XPS overview spectrum for Sipernat® 50 laden with 20% by weight of 2-Mi, produced by the method according to the invention Release kinetics of product systems according to the invention with sodium hydroxide solution as active ingredient at various temperatures.

STORAGE-STABLE PRODUCT SYSTEMS FOR PREMIX FORMULATIONS

CROSS-REFERENCE TO RELATED APPLICATIONS

This patent application is a national stage filing under 35 U.S.C. 371 of International Application No. PCT/EP2009/051137, filed 2 Feb. 2009, which claims the benefit of priority to German Patent Application No. 102008000290.9, filed 13 Feb. 2008, the disclosures of which are incorporated by reference herein in their entireties. Priority to each application is hereby claimed.

The present invention relates to storage-stable product systems with high latency and good mechanical stability which are suitable, inter alia, for premix formulations. In addition, the present invention relates to a method for producing the formulations according to the invention, and to the use thereof.

The formulation of active ingredients to give product systems which permits the delayed release of active ingredients has considerable advantages over the conventional administration of active ingredients. Thus, the dosage of the active ingredients and the site of release can be controlled and the active ingredients can continuously released over a prolonged period. Consequently, it is often possible to achieve better utilization and a reduction in the required amount of active ingredients, which in term reduces side-effects, reduces the environmental impact and conserves natural resources.

Product systems for the controlled release of sensitive active ingredients are also known from the literature. These systems are used in order to avoid undesired conversion or decomposition and to improve the storability of sensitive active ingredients. Furthermore, for some usages, for example in the area of construction chemicals or in the case of adhesives, handling advantages can be attained.

In the field of pharmaceutical products, a targeted release of the active ingredients in a pregiven area of the body is often desired. Product systems have likewise been developed for these aims. Product systems with delayed active ingredient release are likewise often used in the pharmaceutical sector. Here, it is a case of administering an active ingredient as uniformly as possible over a prolonged period or releasing the active ingredient at certain sites in the human or animal body. A comprehensive report on this can be found, for example, in "Modified-Release Drug Delivery Technology" (M. J. Rathbone, J. Hadgraft, M. S. Roberts, editors), Marcel Dekker Inc., New York, 2003. Similar product systems have also been developed for controlled release of pesticides and other crop protection compositions. A comprehensive overview on this subject can be found in Park et al., "Controlled release of pesticides from microparticles", pages 89-136 in: Controlled-Release Delivery Systems for Pesticides (H. B. Scher, editor). Marcel Dekker Inc., New York, 1999.

One concept that is often used for targeted active ingredient release is based on the embedding of the active ingredient in a suitable matrix, the matrix in most cases being an organic polymer substance. The matrix can be designed such that the active ingredient passes by diffusion through the matrix or, as a result of the erosion or breakup of the matrix, slowly to its surface, where it is brought into contact with a suitable solvent. In another variant, the matrix material is designed such that a solvent diffuses through the matrix material and thus arrives at the active ingredient. Both systems have the disadvantage that the diffusion is a relatively slow process and relatively large amounts of active ingredient cannot be released all at once. Both systems are therefore suitable only for fields of use where what matters is long-lasting, uniform active ingredient release. Furthermore, in the case of such a particle structure, a considerable part of the active ingredient is located directly on the surface, which very often can lead both to the decomposition of sensitive active ingredients during storage, and also to the undesired immediate release of the active ingredient. This problem is particularly marked when the product system is synthesized in the form of microparticles having an average diameter below 200 μm. Examples of systems with an organic matrix are the products described in WO 2004/072153 and WO 03/033027. A disadvantage here is the low stability, in particular the low pressure loadability of these systems, where this low loadability can cause problems during storage. Furthermore, the use of these products is often limited to less chemically aggressive active ingredient.

Another system involves the binding of an active ingredient into a porous carrier material, e.g. an inorganic oxide, and closing parts of the pores by a protection system. This leads to only some of the pores being accessible for a solvent and thus the active ingredient release being slowed. However, a disadvantage of this system is that the system releases the active ingredient as soon as it comes into contact with the solvent, i.e. in the case of soluble active ingredients and premix formulations with at least one corresponding solvent, such product systems are unsuitable for targeted release of the active ingredient at the site of application since the active ingredient comes into contact with the solvent during the premixing and is released.

A further development of the aforementioned product system includes the complete covering of a porous carrier material containing active ingredient with a protective layer such that all of the pores are closed by the protective layer. The active ingredient release can then take place either by diffusion of the active ingredient through the protective layer, which again is a slow process and generally leads to incomplete active ingredient release. Alternatively, the active ingredient can be released in such systems following breakup of the protective layer. Since the protective layer is applied outside of the carrier material, these systems are very sensitive to mechanical stresses during production, transportation or use of the product systems. I.e. mechanical action leads to an at least partial destruction of the protective layer, meaning that an undesired release of active ingredient is thereby triggered. Consequently, such systems can only be used in specific areas. Examples of such systems can be found inter alia in WO 02/098998, WO 00/51724, WO 2006/004481, CH 573212, EP-A-0 454 881 and CA 2 438 438.

The products disclosed in the specification WO 02/098998 include an inorganic matrix which are produced by a sol/gel process. In this process, firstly an active ingredient is complexed with a carrier molecule and the product obtained in this way is incorporated into a matrix which is produced by a sol/gel process. These methods are costly and complex in terms of handling, with product release taking place via the cavities produced during the formation of the matrix. As a result of this, no active release of the components is made possible, rather the substances are fixed in a matrix and released in the presence of a solvent without it being possible to control the time of release. Thus, the release of the active ingredient takes place directly by adding solvent. Release at a later time is not possible.

The specification WO 2006/004481 discloses an additive for feeds which has antimicrobial properties. The additive comprises a porous carrier and also acids which have been incorporated into the carrier as active ingredients. To control the release, the system comprises a core with a strong acid and an outer layer which comprises an acid which has a higher pH than the acid in the core. Release is controlled here via a diffusion control, it being possible for the outer layer to be porous in order to permit diffusion of the acid from the core outwards.

Furthermore, the document WO 00/51724 describes a system for the controlled release of active ingredients which comprises an inorganic matrix. Release of the active ingredient can be controlled by diffusion. This means that the release rate can be influenced via the pore size. However, systems of this type cannot therefore be stored together with a liquid in which the active ingredient is soluble since the active ingredient inevitably diffuses into the solution. Although WO 00/51724 also explains the option of a controlled release of the active ingredient, with various control signals being described, a specific solution for the problem of a release controlled by an external signal is not described.

Furthermore, the specification CH 573212 describes a composition which can be used in particular in agriculture. This composition comprises a porous carrier material, for example kieselguhr, an active ingredient and a protective layer, for example made of organic compounds, which brings about a delay in the active ingredient release. The protective layer here is soluble in a solvent, in particular water. Upon contact with water, the protective layer is broken up after a time determined by the solubility of the protective layer. Following the breakup of the protective layer, the active ingredient is released with diffusion control. A disadvantage of this system, however, is poor handling, which hinders processing of these systems. Upon contact with moisture, these systems often have a tendency toward aggregation, as a result of which controlled application is hindered. A mixing of this composition with further substances may also lead to problems associated with observing mixing ratios.

The application EP-A-0 454 881 describes a composition which comprises a porous carrier material which is laden with an acid. Furthermore, the composition has a plurality of layers which permit controlled release of the acid, where the outermost layer can comprise compounds ("anticoalescent") which can prevent agglomeration of the Particles. The release of the acid can take place via various methods, each of which is associated with a breakup or a destruction of the protective layers. A disadvantage here is in particular the processability or handling of the particles. For example, in the event of inappropriate handling of the composition, the acids can be released undesirably. This is particularly critical for plants in which these compositions are processed since the acids can lead to corrosion of the plants. Plants made of acid-resistant materials, however, are expensive. If plants of this type are used, then the acids can also be processed directly.

Document CA 2 438 438 discloses porous silicate particles which are laden with active ingredient. The particles are provided with a layer which permit controlled release of the active ingredient. The particles described in this document have the same problems which the particles according to CH 573212 and PP-A-0 454 881 also exhibit.

There therefore continues to be a great need for suitable product systems which have high stability to mechanical stresses and permit rapid and as complete as possible an active ingredient release at a certain site or from a certain time. i.e. these product systems should as far as possible release no active ingredient during storage and/or during transportation to the site of action, but should release the complete active ingredient as rapidly and completely as possible at the site of action.

It was therefore an object of the present invention to produce new types of product systems which do not have, or have only to a reduced extent, the aforementioned disadvantages of the product systems of the prior art. In addition, the aim is to provide a method for producing such product systems.

Further details not explicitly specified arise from the overall context of the description, examples and claims of the present invention.

Surprisingly, the aforementioned object is achieved by new types of product systems as defined and characterized in the claims of the present invention and also in the description below. These new types of product systems are characterized in that a carrier material is laden with at least one active ingredient and at least one protection system, where the protection system is arranged to the greatest possible extent in the pores of the carrier material and not on its surface. In addition, it is ensured that all or largely all of the pores of the carrier material are filled with the protection system in such a way that no solvent can come into contact with the active ingredient. In contrast to product systems in the prior art, the product systems according to the invention have the advantage that undesired active ingredient releases do not result.

Moreover, the protection system of the product systems according to the invention is designed so that it can be deactivated in a targeted manner such that, spontaneously, the entire active ingredient or at least a large part of the total active ingredient is released. The product systems according to the invention thus have very good latency. This latency can be designed such that, prior to the deactivation, approximately no or no active ingredient release can take place, but afterwards an active ingredient release can take place spontaneously.

As a result of the fact that the protection system is arranged for the greatest part or completely in the pores and not as a coating around the carrier material, the product systems according to the invention are insensitive towards mechanical stresses. This means that the formulations according to the invention can be incorporated into premixes without the active ingredient being released. During the production of premixes, on the one hand mechanical forces act upon the particles (via the mixer), but on the other hand the formulations according to the invention also come into contact with the further components of the premix formulation. The product systems according to the invention can be incorporated into such formulations without or largely without the active ingredient being released. However, as soon as a certain input of energy or a change in the chemical environment has an effect on the premix, the active ingredient is spontaneously released. Environmental influences, such as e.g. humidity, and contact with solvents do not lead to a premature active ingredient release, i.e. the product systems according to the invention exhibit very good latency. For example, active ingredients which should be present in foods, e.g. yoghurt, but should only be released in the stomach are encapsulated with the product systems according to the invention in such a way that they withstand the incorporation into the yoghurt and the storage without the active ingredient being released. Only upon contact with the stomach acid is the active ingredient then spontaneously released. Conventional product systems with "core/shell" construction are not suitable for achieving such an object since, upon incorporating the product system into the yoghurt, i.e. the production of the premix, at least parts of the shell are destroyed by the mechanical influences, meaning that in the course of the storage of the premix, active ingredient is gradually removed from the formulation.

Moreover, the method according to the invention is cost-effective and efficient since low-cost carrier materials, u such as, for example, precipitated silicas, can be laden in conventional apparatuses with the carrier material and the protection system without special apparatuses being required for this purpose. During packaging and transportation it is also possible to dispense with special measures, thus affording economic advantages.

Finally, it is possible, depending on the choice of protection system and the trigger mechanism, to satisfy any desired release scenarios in terms of time. Thus, for example a mixture of two product systems can be produced in which one part of the particles is equipped with a protection system which releases the active ingredient upon reaching a certain temperature, but the other part of the particles does not release the active ingredient at this temperature, but the active ingredient is released as a result of a change in pH. Consequently, active ingredients can also be released in a targeted manner to various sites.

Finally, it is also possible to permit a delayed active ingredient release over a prolonged period, but which only starts at a very specific time, i.e. which is preceded by a latency time in this embodiment of the present invention, e.g. the active ingredient in a matrix from which it must diffuse out could be incorporated into a carrier and additionally the pores could be provided with a protection system which only permits contact of the active ingredient with a solvent after a targeted influence.

Moreover, as a result of the targeted active ingredient release of the formulations according to the invention in combination with the latency, undesired side-effects can be avoided. For example, it is possible to produce product systems according to the invention which have no kind of active ingredient on the surface and moreover permit no kind of contact between active ingredient and the environment. This is not the case for systems in the prior art with incomplete pore closure or diffusion mechanism.

Consequently, the present invention provides product systems comprising
  at least one inorganic and/or organic porous carrier,
  at least one active ingredient which is introduced into the porous carrier, and
  at least one further substance of the at least part of the total amount present in the product system is introduced in the pores of the carrier material,
which are characterized in that, detected by investigating the outermost atomic layer of the product system by means of XPS, at least part of the outermost surface of the product system is formed by the carrier material.

Also provided are product systems comprising
  at least one inorganic and/or organic porous carrier,
  at least one active ingredient which is introduced into the porous carrier, and
  at least one further substance of the at least part of the total amount present in the product system is incorporated in the pores of the carrier material,
characterized in that these further substance and/or substances forms/form a protection system for the active ingredient/active ingredients which is designed such that, through a deactivation of the protection system as a result of an input of energy and/or chemical conversion and/or breakup of the protection system, the protection system is changed in such a way that, preferably spontaneously, at least 50% by weight of the active ingredient/active ingredients is/are released.

Likewise provided by the present invention is a method for producing a product system according to the invention, characterized in that an active ingredient is introduced into a porous carrier and a protection system is produced.

Finally, the present invention provides the use of the particulate composition according to the invention for producing foods, feeds, medicaments, products for the land and forestry, cosmetics, components for coating formulations and adhesive formulations or components for sports equipment and sports clothing, and also said articles per se.

The subjects of the present invention are described below in detail. The terms used in the description, the drawings, the claims and the abstract of the present invention are defined as follows:

Within the context of the present invention, particulate or particle refers to a three-dimensional body made of at least one inorganic and/or organic material with a defined outer shape which—depending on the size of the particle—can be ascertained by means of microscopic methods (light microscope, electron microscope etc.). The particles according to the invention may be porous, i.e. have pores and/or internal cavities.

The product system according to the invention comprises
  at least one inorganic and/or organic porous carrier,
  at least one active ingredient which is introduced into the porous carrier, and
  at least one further substance of the at least part of the total amount present in the product system is introduced in the pores of the carrier material,
characterized in that, detected by investigating the outermost atomic layer of the product system by means of XPS at least part of the outermost surface of the product system is formed by the carrier material.

It is essential that the largest possible part of the outer surface of the product system according to the invention is formed by the carrier material. In contrast to systems in the prior art, in the case of the systems according to the invention, the largest part of the total amount of active ingredient(s) and protective substance(es) is located in the pores of the carrier. Consequently, the protection system cannot be damaged by mechanical influences as is the case with systems in the prior art in which the pores are filled completely, i.e. to the maximum absorption capacity, with active ingredient, and the protective substance forms an independent shell, as in the case of an onion skin, around the carrier filled with active ingredient.

The carrier materials according to the invention are generally stable upon mechanical stresses such as transportation and filling. As a result, the carrier material protects the active ingredient/protective substance system embedded therein. In the case of the systems in the prior art, upon destruction of the outer protective substance shell, the pores, which are filled up to the edge with active ingredient, are exposed and the active ingredient can escape, i.e. a targeted release of active ingredient is no longer possible.

The product systems according to the invention are thus characterized in that their outer surface is formed at least partly by the carrier material. Preferably, at least 10%, particularly preferably at least 15%, very Particularly preferably at least 20%, of the outer surface of the product systems according to the invention, according to measurement of the outermost atomic layer by means of XPS, is formed by the carrier material and not by the molecules of active ingredient/active ingredients and/or protective substance/protective substances.

For specific applications, it is also advantageous that the outer surface of the product systems according to the invention is free from active ingredient(s) so that these active ingredient fractions do not trigger any premature undesired reaction. In one particular embodiment of the present invention, according to measurement of the outermost atomic layer by means of XPS, no active ingredient is located on the outer surface of the product systems according to the invention, or at most 10%, preferably at most 5%, particularly preferably at most 1%, of the outer surface is covered by active ingredient.

The product system comprises at least one organic and/or inorganic, preferably porous carrier material with active ingredient(s) adsorbed or absorbed therein. The carrier material per se is preferably insoluble or only slightly soluble in water. It can, for example, be selected from the group which consists of preferably precipitated, porous carrier oxides of aluminum and/or of silicon and phosphorus-containing substances, preference being given to using silicas, silica gels, fumed silicas, aluminum oxides, clays, sheet silicates, zeolites, diatomaceous earths, and mixed oxides. They are particularly preferably precipitated silicas or silica gels in the form of powders, granules or microgranules having an average diameter $d_{50}$ greater than or equal to 3 μm. Particular preference is given to the commercially available carrier silicas from Evonik Degussa GmbH, e.g. Sipernat® 2200, Sipernat® 22, Sipernat® 50, Ma Silica, from Rhodia Chimie, e.g. Tixosil 38X or Tixosil 68 or PPG, e.g. HiSil SC 72 or HiSil SC 60. Comparable carrier silicas from other companies, however, are likewise suitable.

The unladen inorganic and/or organic porous carrier material preferably have a DBP absorption (according to DIN 53601) of at least 180 g/100 g. The pores accessible for DBP are also accessible for the active ingredient and the substances of the protection system, and a high DBP is therefore important in order to achieve a high loading of the pores of the carrier with active ingredient and protective substance. Consequently, too low a DBP absorption may, depending on the active ingredient, be ineffective since too much carrier material has to be used. The DBP absorption of the carrier material is preferably it the range from 180 to 600 g/(100 g), particularly preferably from 180 to 500 g/(100 g), very particularly preferably from 200 to 500 g/(100 g) and especially preferably from 240 to 500 g/(100 g), very particularly preferably 240 to 400 g/(100 g) and specifically preferably 240 to 350 g (100 g).

Furthermore, it has proven to be advantageous if the carrier material and preferably also the entire product system are particulate. The particles of the carrier material and/or of the product system particularly advantageously have an average particle size $d_{50}$ in the range from 5 μm to 5000 μm, preferably 5 μm to 1000 μm, particularly preferably from 5 to 500 μm, very particularly preferably from 5 to 150 μm and especially preferably from 10 to 100 μm. If the particles are too small, then undesired dust formation may result. In addition, if the outer surface compared to the inner surface is so large that it becomes difficult or even impossible to prevent the active ingredient being absorbed on the outer surface. Excessively large particles in turn have the disadvantage that they are often mechanically unstable and are unsuitable for further processing. They are furthermore often incompatible with the end formulation and have pores which are too deep, meaning that the absorption and desorption rates can be too slow and/or parts of the absorbed active ingredient can no longer be desorbed.

It has proven to be advantageous if the weight ratio of protective substance to active ingredient is in the range from 10:1 to 1:10. The ideal ratio depends on the chemical nature and the physiochemical properties of the active ingredient and of the carrier material and also of the protection system and can be determined for any material combination by simple experimental series. Higher loading of the carrier material can lead to protective substance no longer being able to be introduced to an adequate extent into the pores, meaning that the latency is no longer ensured. Too little loading is not economically sensible. Particularly preferably, the weight ratio of protection system to active ingredient is in the range from 10:1 to 1:10, very particularly preferably the range from 5:1 to 1:5 and especially preferably in the range from 2:1 to 1:3.

Besides the weight ratio, it may be advantageous, depending on the material combination, to observe a certain ratio of DBP absorption and absorbed amount of active ingredient. Without being bound to one specific theory, the inventors are of the view that DBP, the active ingredients to be absorbed and the protective substances often have a similar space requirement in the pores of the carrier material and also penetrate into similarly sized pores. Consequently, this ratio gives information about how much space is still present in the pores accessible for the protective substance and can thus ensure that an adequate amount of active ingredient and also protective substance can be introduced into the pores. It has thus proven to be advantageous that the loading of the porous carrier with active ingredient is at least 10% by weight to 90% by weight, preferably 10% by weight to 80% by weight, particularly preferably 20% to 70% by weight and very particularly preferably 30% to 60% by weight, based on the DBP absorption of the porous carrier. In one specific embodiment, the loading of the porous carrier with active ingredient is 1% by weight to 9% by weight, based on the DBP absorption of the porous carrier.

As already explained, one essential feature of the silicas according to the invention is that the largest amount of protective substance is present within the pores of the carrier material and is not absorbed on the surface of the carrier material. This can prevent the protection system being damaged and deactivated e.g. by abrasion. For the same reason, it has proven to be advantageous to state the absorbed amount of protective substance relative to the DBP absorption of the carrier material. It has proven to be Particularly advantageous if the loading of the porous carrier with protective substance is at least 10% by weight to 90% by weight, preferably 10% to 80% by weight, particularly preferably 20% to 70% by weight and very particularly preferably 20% to 50% by weight, based on the DBP absorption of the porous carrier. Too low a loading may lead, depending on the pore structure of the carrier material, to an impairment in the effect of the protection system. Too high an amount of protection system can have a disadvantageous effect on the targeted deactivation and/or is economically ineffective since as much active ingredient as possible and as little protective substance as possible should be absorbed.

In the present invention, active ingredients are understood as meaning chemical compounds or natural substances which have such a high solubility and/or reactivity and/or instability under the preprocessing, storage and/or application conditions that they cannot be mixed with other components of the end formulation without suitable protective measures and/or stored and/or transported to the site of action, i.e. the site at which their reactivity is to be unfolded and/or fixed at the site of action until the desired release time. They may, however, also be chemical substances which are viscous and not very flowable and consequently have to be made flowable through absorption on a carrier material, although desorption from the carrier material must take place rapidly and completely as far as possible, preferably exclusively, at a certain time. The active ingredients can in principle be present as liquid, oil, resin, solution, dispersion, suspension or as melt. The only prerequisite is that the active ingredient can penetrate into the pores of the carrier material.

The preferred active ingredients include, inter alia, hardening agents or initiators, crosslinking agents, catalysts, pharmaceutical active ingredients, cosmetic active ingredients, cleaning and/or care agents, flavorings, aroma substances or fragrances, feeds or feed additives, such as, for example, amino acids, vitamins, mineral substances, foods or food additives, dyes and/or pigments, amino acids, oxidizing agents or bleaches, additives with microbiocidal, in particular fungicidal or bactericidal, effect, agrochemicals and/or a concrete additive.

These include, inter alia, fragrances; oils such as essential oils, perfume oils, care oils, scented oils and silicone oils; antibacterial, antiviral or fungicidal active ingredients; disinfectant and antimicrobial substances; deodorants; antioxidants; biologically effective substances and biogenetic active ingredients; vitamins and vitamin complexes; enzymes and enzymatic systems such as amalyses, celluloses, lipases and proteases; cosmetically active substances such as ingredients for cosmetics and body care compositions; washing- and cleaning-active substances such as surfactants of all types, washing- and/or cleaning-active inorganic and organic acids, soil repellent and soil release active ingredients, oxidizing agents and bleaches, bleach activators, builders and cobuilders, antiredeposition additives, graying and discoloration inhibitors, active substances for color protection, substances and additives for caring for laundry, optical brighteners, foam inhibitors, pH extenders and pH buffer substances; UV protective substances, UV absorbers, fluorescent and phosphorescent agents; dyes, dye compositions, color pigments and other coloring substances such as solvatochromes and indicator dyes, initiators and hardeners; catalysts and pharmaceuticals of all types; and mixtures of the aforementioned compounds.

The product systems according to the invention can comprise fragrances, aroma substances and odorants. Such substances are generally known and commercially available. Suitable fragrances are described, for example, in U.S. Pat. No. 5,500,138.

As used herein, fragrances encompass natural (i.e. substances obtained for example by extraction from plants, such as, for example, flowers, foliage, leaves, roots, barks, woods, blossoms etc., or animal products), synthetic (i.e. a mixture of different natural oils or oil constituents) and synthetic (i.e. synthetically produced) pleasant-smelling substances or mixtures of these substances. Such materials are often used together with further compounds, such as fixing agents, extenders, stabilizers and solvents. Within the context of the present invention, these auxiliaries or additives are encompassed by the meaning of the term "fragrance". Usually, therefore, fragrances are complex mixtures of a large number of organic compounds.

Natural compounds include not only readily volatile substances; these also include medium-volatility and moderate-volatility substances. An exemplary list of fragrances includes, inter alia, the following compounds:

Natural substances, such as tree moss absolute, basil oil, citrus fruit oils (such as bergamot oil, mandarin oil, etc.) mastix absolute, myrtle oil, palmarosa oil, oils from the patchouli plant, petitgrain oil, in particular from Paraguay, wormwood oil; alcohols, such as farnesol, geraniol, linalool, nerol, phenylethyl alcohol, rhodinol, cinnamyl alcohol; aldehydes, such as citral, helional, α-hexylcinnamylaldehyde, hydroxycitronellal, filial (p-tert-butyl-α-methyldihydrozimtaldehyde), methylnonyl-acetaldehyde; ketones, such as allylionone (1-(2,6,6-trimethyl-2-cyclohexen-1-yl)-1,6-heptadien-3-one), α-ionone, β-ionone, isomethyl-alpha-ionone, methylionone; esters, such as allyl phenoxyacetate, benzyl salicylate, cinnamyl propionate, citronellyl acetate, citronellyl ethoxolate, decyl acetate, dimethylbenzylcarbinyl acetate, dimethylbenzylcarbinyl butyrate, ethyl acetoacetate, ethyl acetylacetate, hexenyl isobutyrate, linalyl acetate, methyl dihydrojasmonate, styrallyl acetate, vetiveryl acetate, etc.; lactones, such as gamma-undecalactone; various constituents which are often used for producing perfumes, such as musk ketone, indole, p-menthane-8-thiol-3-one and methyleugenol; and acetals and ketals, such as methyl and ethyl acetals and ketals, and also the acetals or ketals which are based on benzaldehyde, which contain phenylethyl groups, or acetals and ketals of oxotetralins or oxoindanes (cf. U.S. Pat. No. 5,084,440).

Furthermore, fragrances which can be used according to the invention include geranyl acetate, dihydromyrcenyl acetate (2,6-dimethyloct-7-en-2-yl acetate), terpinyl acetate, tricyclodecenyl acetate (CAS 5413-60-5), tricyclodecenyl propionate (CAS 17511-60-3), 2-phenylethyl acetate, benzyl acetate, benzyl benzoate, styrallyl acetate, amyl salicylate, phenoxyethyl isobutyrate, neryl acetate, trichloromethyl phenylcarbinylacetate, p-tert-butyl-cyclohexyl acetate, isononyl acetate, cedryl acetate, benzyl alcohol, tetrahydrolinalool, citronellol, dimethylbenzylcarbinol, dihydromyrcenol, tetrahydromyrcenol, terpineol, eugenol, vetiverol, 3-isocamphylcyclohexanol, 2-methyl-3-(p-tert-butyl-phenyl)propanol, 2-methyl-3-(p-isopropylphenyl)propanol, 3-(p-tert-butylphenyl)propanol, α-n-amylcinnamylaldehyde, 4-(4-hydroxy-4-methylpentyl)-3-cyclohexenecarbaldehyde, 4-(4-methyl-3-pentenyl)-3-cyclohexenecarbaldehyde, 4-acetoxy-3-pentyltetrahydropyran, 2-n-heptyl-cyclopentanone, 3-methyl-2-pentylcyclopentanone, n-decanal, n-dodecanal, hydroxycitronellal, phenylacetaldehyde dimethylacetal, phenylacetaldehyde diethylacetal, geranonitrile, citronellonitrile, cedryl methyl ether, isolongifolanone, aubepine nitrile, aubepine, heliotropin, coumarin, vanillin, diphenyl oxide, ionone, methylionone, isomethylionone, cis-3-hexenol and cis-3-hexenol ester, musk compounds, which may have inter alia an indane, tetralin or isochromane structure, macrocyclic ketones, macrolactone-musk compounds, ethylene brassylate, aromatic nitromusk compounds. Said fragrances can be used individually or as a mixture.

The aroma substances which can be used for use as active ingredient include wintergreen oil, oregano oil, laurel leaf oil, peppermint oil, mint oil, clove oil, sage oil, sassafras oils, lemon oil, orange oil, anise oil, benzaldehyde, bitter almond oil, camphor, cedar leaf oil, marjoram oil, lemon grass oil, lavender oil, mustard oil, pine oil, pine needle oil, rosemary oil, thyme oil, cinnamon leaf oil, and mixtures of these substances.

Organic and/or inorganic pigments can be used as active ingredient. Furthermore, within the context of the present invention, the term "pigment" includes materials which bring about a weakening of color or shine, such as substances which lead to a matting of surfaces or scattering of light. Examples of the pigments that can be used are iron oxides, ultramarine blue, D & C dyes, carmine and mixtures of these substances. The pigments may be treated. The treatment agents include, for example, amino acids, silicones, and lecithin and ester oils.

Enzymes which can be used as active ingredients include, inter alia, bacterial and fungus-like cellulases such as Carezyme and Celluzyme (Novo Nordisk A/S); peroxidases; lipases such as Amano-P (Amano Pharmaceutical Co.), M1 Lipase® and Lipomax® (Gist-Brocades) and Lipolase® and Lipolase Ultra® (Novo); cutinases; proteases, such as, for example, Esperase® Alcalase®, Durazym® and Savinase® (Novo) and Maxatase®, Maxacal® Properase® and Maxapem® (Gist-Brocades); and α- and β-amylases such as Purafect Ox Am® (Genencor) and Termamyl®, Ban® Fungamyl®, Duramyl® and Natalase® (Novo); and mixtures of these enzymes with one another and also with other active ingredients.

Cosmetic active ingredients, in particular as constituent of skin and hair cosmetics, include inter alia vitamins and various lipophilic or hydrophobic substances which have a moisturizing effect or an emollient effect, in particular liquids, gels, waxes, particulate solids, etc. Lipophilic or hydrophobic substances that can be used include inter alia fatty acids such as lauric acid and oleic acid; esters of fatty alcohols or fatty acids, such as isopropyl myristate and isopropyl palmitate; water-insoluble ethers and alcohols, such as lauryl alcohol, hexadecyl alcohol and oleyl alcohol, paraffins and mineral oils, silicones and mixtures of these compounds with one another and also with other active ingredients. These materials are described inter alia in the documents U.S. Pat. Nos. 4,053,851, 4,065,564, 4,073,880, 4,278,655 and GB-A-2, 018,590.

These substances include in particular also compounds which are used in connection with hair cosmetic applications, such as alkali compounds, in particular NaOH, KOH, which are used in particular for producing permanent waves.

The oxidizing agents and bleaches include, inter alia, compounds which release chlorine or oxygen, such as, for example, hydrogen peroxide, inorganic peroxides or organic peroxides.

Inorganic peroxides include, inter alia, perborates, percarbonates, perphosphates, persulfates and persilicates, it being possible to use in particular the alkali metal salts.

Sodium perborate can be used, for example, in the form of the monohydrate of empirical formula $NaBO_2H_2O_2$ or the tetrahydrate according to the empirical formula $NaBO_2H_2O_2 \cdot 3H_2O$. Alkali metal percarbonates, in particular sodium percarbonate, are often complexes of alkali metal carbonate and hydrogen peroxide. For example, sodium percarbonate is understood as meaning a complex compound with the empirical formula $2Na_2CO_3 \cdot 3H_2O_2$, this being commercially available. Potassium peroxymonopersulfate can likewise be used as bleaching or oxidizing agent.

Organic peroxides include, for example, arylperoxy acids, such as, for example, perbenzoic acid, alkylperoxy acids, such as, for example, peracetic acid and pernonanoic acid, cationic peroxy acids and amide-substituted peroxy acids, which are described, for example, in EP-A-0 170 386. Further organic peroxy acids include diacyl and tetraacyl peroxides, for example diperoxydodecanoic acid, diperoxytetradecanoic acid and diperoxyhexadecanoic acid. Dibenzoyl peroxide belongs to the preferred organic peroxy acids. Mono- and diperazelaic acid, mono- and dipererucaic acid and N-phthaloylaminoperoxicapronoic acid are likewise suitable.

Moreover, hardeners and/or initiators represent an important class of active ingredients. These compounds can be used inter alia in adhesives and in construction chemicals.

The substances include in particular radical starters, which are used in a large number of applications. These initiators include inter alia the azo initiators known widely in the specialist field, such as AIBN and 1,1-azobiscyclohexanecarbonitrile, and also peroxy compounds, such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl)peroxydicarbonate, mixtures of two or more of the aforementioned compounds with one another, and also mixtures of the aforementioned compounds with unspecified compounds which can likewise form radicals.

A further class of active ingredients is catalysts. Catalysts are used to increase the rate of a large number of different chemical reactions. The present invention permits in particular the very specific use of catalysts at a certain time, where a particularly uniform distribution of the catalyst in the reaction mixture even at the start of the reaction is possible.

The preferred catalysts include in particular metal-containing catalysts which are used for hydrogenation, for example for the hardening of fatty acids, nitriles and polyol hydrogenation, hydrogenation of resins, aromatics and white oils; selective hydrogenation of acetylenes and dienes, and also selective hydrogenation of AMS to cumene.

Furthermore, these include catalysts which are used for oxidation, for example for selective oxidation in the production of ethylene oxide and vinyl acetate monomers. These catalysts generally include metals, for example nickel, cobalt, copper, molybdenum, chromium, iron, and also platinum metals, for example rhodium, palladium, platinum. Catalysts of this type are known per se and described, for example, in Römpp Chemie Lexikon 2nd edition on CD-ROM, and also Ullmann's Encyclopedia of Industrial Chemistry, 5th edition on CD-ROM.

Moreover, the product systems can comprise active ingredients which can be used in agriculture. These include, for example, herbicides, fungicides, antibiotics, fertilizers and feed additives, for example vitamins, mineral substances and hormones, and also veterinary medicine pharmaceuticals, for example antibiotics and vaccines.

Furthermore, pharmaceuticals are a class of active ingredients which may likewise be present as active ingredient in the product systems according to the invention. Pharmaceuticals are generally understood as meaning a substance which exhibits in vivo a desired effect, in particular a therapeutic effect. Accordingly, pharmaceuticals are in particular substances which can be used for the treatment of diseases or for achieving another biological effect. A pharmacologically active substance can accordingly be an organic or inorganic compound, and also a living or dead organism. These include, inter alia, proteins, polypeptides, polysaccharides (e.g. heparin.), oligosaccharides, mono- or disaccharides, organic compounds, organometallic or inorganic compounds which can include any known element; living or dead cells, bacteria, viruses or one part thereof; hormones; growth factors, for example virus-producing growth factor; growth factor inhibitors, growth factor receptors, receptors or receptor blockers (e.g. a $11a/111b$ inhibitor) or a complete or partial gene in a suitable expression vector or construct thereof for the local generation of therapeutic agents. Pharmaceuticals include agents which are used for long-term treatment, such as hormone treatments, for example for preventing conception, and substances which are particularly expedient for the treatment of diseases such as osteoporosis, cancer, epilepsy, Parkinson's disease and pain. The pharmaceuticals which can be used may be e.g. anti-inflammatory agents, agents for fighting infectious diseases (e.g. antibiotics and antivirals), analgesics and analgesic combinations, agents for the treatment of asthma, anticonvulsants, restoratives, agents for the treatment of diabetes, antitumor agents, anticancer agents and agents which are used for the treatment of cardiac vessel diseases or mental illnesses, for example depression.

According to one particular aspect of the present invention, as active ingredient, it is possible to use compounds which preferably have a molecular weight of at most 2000 g/mol, particularly preferably at most 1000 g/mol.

The product system of the present invention can comprise one or more active ingredients. Here, the active ingredients may be present within the porous carrier as a homogeneous mixture. Furthermore, the active ingredients can also be arranged in layer form within the porous carrier, in which case the porous carrier can have two, three or more layers which may differ from one another in terms of type and composition of the active ingredients.

Within the context of the present invention, protection system is understood as meaning a substance/a combination of two or more substances which prevents/prevent the active ingredient decomposing and/or reacting prematurely and/or being undesirably able to escape from the carrier material, but at the same time also allows/allow the active ingredient to be released as rapidly and completely as possible following targeted deactivation of the protection system.

The protection system is incorporated largely, i.e. preferably to at least 30% by weight, particularly preferably to 50% by weight, very particularly preferably to 70% by weight—in each case based on the amount of active ingredient used—in the pores of the carrier material impregnated beforehand with active ingredient, such that an active ingredient layer, which is arranged closer to the core of the carrier material, and a protective layer, which is arranged facing toward the outer surface of the carrier material, are formed in the pores. The active ingredient is thus shielded from influences in the surrounding area. For example, it can be assumed that the pores of the inorganic porous carrier, which has been partially provided with active ingredient, are closed by the protective compound. Following partial breakup or partial destruction of this closure of the pores, the active ingredient can be released.

The term "protection system" was chosen to make it clear that the present invention does not use a customary coating in order to achieve controlled release of active ingredients. Rather, the system is designed such that a high mechanical stability is associated with a very specific release mechanism.

In order to be able to construct an effective protection system, it is advantageous if active ingredient and protection system have a different polarity or a different solubility or dispersibility so that they do not mix with one another. In this connection, the terms "soluble or dispersible" mean that at least 1 g/l, preferably at least 10 g/l and particularly preferably at least 100 g/l, of a substance can be broken up or dispersed in a corresponding solvent. Substances are insoluble if less than 1.0 g/l, preferably at most 0.5 g/l and particularly preferably at most 0.05 g/l, of a substance can be broken up or dispersed. These values refer to the temperature at which the loading of the carrier with the active ingredient and/or the protection system takes place. Preferably, the solubility is measured in a temperature range from 0° C. to 100° C., particularly preferably 25° C.

It may thus be advantageous if the protection system comprises at least one compound which is soluble in a solvent in which the active ingredient does not break up. Particularly preferably, the active ingredient is soluble in a polar solvent and the protective layer is insoluble in water and/or in a polar solvent, or the active ingredient is soluble in a nonpolar solvent and the protection system is insoluble in this nonpolar solvent and/or soluble in a polar solvent and/or water. Suitable nonpolar solvents here are in particular aromatic hydrocarbons, alkanes or a cycloalkane. By virtue of the different polarity/solubility, it can be ensured that the active ingredient and protection system within the pores do not mix, but form clearly separate layers, such that effective deactivation of the protective layer is possible.

According to one particular aspect of the present invention, the active ingredient can be broken up in a polar solvent, for example water, methanol and/or ethanol, whereas the protective layer is insoluble in water. These active ingredients include in particular water-soluble oxides and/or hydroxides, such as, for example NaOH or KOH. Preferably, the protection system according to this aspect has at least one compound which is soluble in a nonpolar solvent, particularly preferably an aromatic solvent, such as toluene, an alkane, in particular hexane or heptane, or a cycloalkane, such as cyclohexane.

The protection system for the active ingredient/active ingredients is preferably designed in such a way that by deactivating the protection system through an input of energy and/or chemical conversion and/or breakup of the protection system, the protection system is changed in such a way that, preferably spontaneously, at least 50% of the active ingredient/active ingredients is/are released.

The selection of the protective material depends primarily on the release conditions. Thus, for example, the release of a radical starter in a chemical reactor may be the aim. Here, the deactivation of the protection system via pressure waves may be the method choice since this is possible very rapidly and effectively. If, for example, a radical quencher is to be added to a radical chain reaction, but can only then come into contact with the other reactants, if the reaction temperature has exceeded a certain limit—in order to prevent a "run away" of the reaction—then the protection system to be used would be a substance which releases the active ingredient upon reaching a certain temperature. Through suitable selection of the protection system, it is thus possible to produce a product system with high latency and storage stability for highly diverse application purposes. A further example is hygroscopic cosmetic and/or pharmaceutical active ingredients which are to be absorbed by the human skin in order to be storage-stable, these substances have to be protected by a protection system and are only released again upon contact with the skin, but then rapidly and completely. For this application, a pH-sensitive protection system is the choice. The aforementioned examples in no way limit the scope of the present invention, but merely serve to explain and clarify the present invention.

In the case of deactivation of the protection system by inputting energy, the energy input preferably takes place by pressure waves, particularly preferably by ultrasound treatment, irradiation with high-energy radiation, preferably UV light and microwaves and/or by the action of artificially generated shear forces and/or temperature increase. Under the influence of the pressure waves (in particular ultrasound treatment), the particulate systems are "ruptured", because the porous carrier body and the active ingredients and protection systems stored in the pores oscillate under the influence of the pressure waves and/or cavitation at different frequencies (on account of different mechanical properties). The particles break apart and open up to the outside medium access to the no longer protected active ingredient. In the case of release by increasing the temperature, transportation of the active ingredient to the outside is ensured by the melting and/or by the increased rate of breakup of the protection system in the outside medium. In the case of release as a result of UV light or as a result of X-ray irradiation, the protection system is "deactivated" or "opened" by the radiation-based chemical reaction, which is often associated with the temperature increase up to the melting point. In the case of release due to microwaves, part of the encapsulated system is heated locally until the formation of the vapor phase, the internal pressure within the particle increases and leads, as in the case of the release under ultrasound, to the rupture of the particles and opening of the active ingredient. Another variant of the release through the action of microwaves is the local heating of the encapsulation system up to the melting of the protection system and subsequent opening of the access of the outside medium to the active ingredient.

If pressure waves, preferably ultrasound waves are allowed to act on the product system, then, in one particular embodiment of the present invention, at least 80% by weight of the active ingredient/active ingredients are released within 1 hour, preferably at least 80% by weight in 10 minutes, very particularly preferably at least 80% by weight in 5 minutes, especially preferably at least 80% by weight in 1 minute or less. Here, the protection system can be constructed such that it is broken up at a pregiven stress value. This can take place, for example, as a result of the targeted selection of the material and also the amount of protection system based on the total weight of the product. The pressure waves can be adjusted by varying the frequency and the amplitude to a pregiven stress value at which breakup of the protection system takes place. Preferably, the pressure waves can have a frequency in the range from 15 kHz to 100 kHz, particularly preferably in the range from 22 kHz to 30 kHz and an amplitude in the range from 0 to 250 μm, particularly preferably in the range from 40 μm to 100 μm.

If, on the other hand, high-energy radiation is allowed to act on the product system, then, in a further particular embodiment of the present invention, at least 80% by weight of the active ingredient/active ingredients are released over the course of 12 hours, preferably at least 80% by weight in 10 hours, very particularly preferably at least 80% by weight in 5 hours, especially preferably at least 80% by weight in 1 hour or less.

Examples of radiation-sensitive protection systems are, for example, all water-containing protection systems which can be heated locally in a targeted manner through the application of microwave technology. Preferably, the electromagnetic radiation can have a frequency in the range from 1 MHz to 500 GHz, particularly preferably in ranges from 902 MHz to 928 MHz and 2.4 GHz to 2.5 GHz. The electromagnetic radiation can also be adapted to other components of the system. Thus, for example, when using mixed oxides of the type MagSilica® (Evonik Industries AG) as carrier or as constituent of the protection system, the electromagnetic radiation with a frequency in the range from 280 MHz to 320 MHz is particularly preferred.

If, by contrast, the deactivation of the protection system takes place on reaching a certain release temperature, then, in a further particular embodiment of the present invention, at least 60% by weight of the active ingredient/active ingredients are released over the course of 60 minutes, preferably at least 80 by weight in 60 minutes, very particularly preferably at least 80% by weight in 45 minutes, especially preferably at least 80% by weight in 30 minutes or less. In this case, the protective layer is broken up or melted by increasing the temperature, as a result of which the active ingredient is released. According to this aspect of the present invention, the protection system can be broken up preferably by a temperature in the range from 30 to 200° C., particularly preferably 40° C. to 160° C. Here, the protective layer is preferably destroyed within a narrow temperature interval. Thus, the temperature interval at which the protection system is broken up or melted can be less than 20° C., preferably less than 10° C. and very particularly preferably less than 5° C.

Chemical deactivation of the protection system can be triggered, for example, by a shift in pH and/or the action of at least one enzyme on the protection system.

If the deactivation takes place by changing the pH of the protection system, then, in a further particular embodiment of the present invention, at least 70% by weight of the active ingredient/active ingredients are released over the course of 8 hours, preferably at least 80% by weight in 8 hours, very particularly preferably at 80% by weight in 5 hours, especially preferably at least 70% by weight in 1 hour or less.

Examples of pH-sensitive protection systems are, for example, a copolymer of methyl methacrylate and ethyl acrylate (Eudragit L 100-55/L, Acryl EZE, Eastacryl 30D), a copolymer of methyl methacrylate and ethyl acrylate and methacrylic acid, a (meth)acrylate copolymer consisting of 20-40% by weight of methyl methacrylate and 60 to 80% by weight of methacrylic acid (Eudragit L 100/L, S 100/S and further modifications of the Eudragit® product group), a copolymer of methyl methacylate, ethyl acrylate and trimethylammonium ethyl methacrylate, a polyvinyl acetate phthalate (PVAP, Coateric®, Sureteric®), a crosslinked and/or uncrosslinked polyacrylic acid, hydroxypropylmethylcellulose phthalate (H.P.M.C.P. (Eastman), HP (Shin-Etsu)), hydroxymethylethylcellulose (HEMC), ethylcellulose (EC, Ethocel®, Aquacoat® Surelease®), cellulose acetate phthalate (CAP, Cellulosi acetas, PhEur, Celluloseacetate-Phtalate, NF, Aquaterc®), cellulose acetate succinate (CAS), cellulose acetate trimeliate (CAT), hydroxypropylmethylcellulose phthalate (HPMCP, HP50, HP55), hydroxypropylmethylcellulose acetate succinate (HPMCAS -IF, -MF, -HF) or a mixture of said polymers, fatty acids (e.g. stearic acid, palmitic acid) and a mixture of the fatty acids, further polymeric acids, for example polyacrylates which are characterized by the required solubilities as a function of pH on the one hand, and by good processability on the other hand. Further polymeric acids which can be used as coating materials are copolymers of an unsaturated polycarboxylic acid such as maleic acid, citraconic acid, itaconic acid and mesaconic acid with an unsaturated monocarboxylic acid such as acrylic acid or α-alkyl-substituted acrylic acids.

In the case of the action of enzymes on the protection system, in a further particular embodiment of the present invention, at least 80% by weight of the active ingredient/active ingredients are released over the course of 24 h, preferably at least 80% by weight in 15 hours, very particularly preferably at least 80% by weight in 10 hours or less.

Examples of biologically/enzymatically deactivatable protection systems are the natural, semisynthetic or synthetic, inorganic and in particular organic materials known in the prior art, provided it is ensured that the enzymatic-controlled opening of the resulting mixtures is retained.

Natural organic materials are, for example, homopolymers and heteropolymers of carbohydrates, amino acids, nucleic acids, amides, glucosamines, esters, gum Arabic, agar agar, agarose, maltodextrins, alginic acid or its salts, e.g. sodium or calcium alginate, liposomes, fats and fatty acids, cetyl alcohol, collagen, chitosan, lecithins, gelatin, albumin, schellack, polysaccharides, such as starch or dextran, cyclodextrins, sucrose and waxes.

Semisynthetic encapsulation materials are, inter alia, chemically modified celluloses, in particular cellulose esters and ethers, e.g. cellulose acetate, ethylcellulose, hydroxypropylcellulose, hydroxypropylmethylcellulose and carboxymethylcellulose, and also starch derivatives, in particular starch ethers and esters.

Synthetic encapsulation materials are, for example, polymers such as amino resins, polyacrylates, polyamides, Polyvinyl alcohol or polyvinyl pyrrolidone, organopolysiloxanes, non-natural amino acids, non-natural nucleic acids, polyamines, polyols, oligo- and polyisoprenes, esters and polyesters, in particular branched glycerol ester amides, imines, polyphenols, dithiols and phosphodiesters, ethylene glycol, oxymethylene glycoside, acetal units, silicates and carbonates, hyperbranched hydrogels, comb polymers with polyester structure or polyvinyl ppyrrolidone, polylactide.

Further preferred carrier polymers that can be co-used are polycaprolactones, copolymers such as poly(D, L-lactide-co-glycolide) and also the polyester compounds from the product families Dynapol®S and Dynacoll® produced by Evonik Industries AG. These polymers can also serve as admixture for establishing specific polymer properties.

By admixing these polyesters, the composition of the polymer can be adjusted such that the resulting encapsulation material can be degraded enzymatically over a short or long time. Further biologically or Enzymatically deactivatable protection systems such as hyperbranched polymers are described in detail in the patent application WO 2007/048464.

Furthermore, it is possible to achieve deactivation of the protection system by breaking up the protection system in a suitable solvent. Here, the product system is placed in the suitable solvent or in a two-phase system with two solvents, one of which breaks up the protection system and the other of which breaks up the active ingredient, and, preferably within 24 hours, at least 80% by weight of the active ingredient/active ingredients are released, preferably at least 80% by weight in 15 hours, very particularly preferably at least 80% by weight in 10 hours.

Examples of such protection systems are inorganic (e.g. $Na_2SO_4$) and inorganic (e.g. sodium stearate) salts, organic acids (e.g. stearic acid, palmitic acid), polymers (such as polyethylene glycol, polyvinyl chloride), copolymers, alcohols (in particular fatty alcohols), and further chemical substances which are soluble under given release conditions (temperature, pressure, composition) in a solvent present at the site of release.

The product systems according to the invention exhibit excellent latency. Latency means that the product systems release no or only minimal amounts of active ingredient during their production, storage and transportation. Even upon the incorporation of the product systems according to the invention into premix formulations and their subsequent storage, no or only minimal amounts of active ingredient is released for a length of time until activation of the product systems according to the invention takes place, i.e. until the release of active ingredient is triggered as a result of the input of energy or chemical influences.

As already indicated above, the product system according to the invention permits tailored solutions to be created for a large number of application cases. Thus, for example, is possible to produce mixtures of two or more product systems according to the invention which comprise identical or different active ingredients and different protective substances. For example, these mixtures make it possible, upon reaching a certain temperature, for 20% by weight of the active ingredient to be spontaneously released, from formulations with temperature-sensitive protective layer and active ingredient underneath, but the remaining 80% by weight of the active ingredient to be released constantly over a prolonged period from a second product system with temperature-sensitive protective layer and active ingredient embedded underneath in a diffusion-open matrix. Another example would be a mixture of product systems, of which one part of the active ingredient is released after changing the pH, but another part is only released after the action of ultrasound. Possible combinations of active ingredient/protection systems and breakup mechanisms can be derived easily by reference to the above description and form part of the present invention even if they are not described explicitly. In a further example, the protective compound can have a very specific melting point. If the product system is heated to temperatures above this melting point, then the active ingredient is released since the protective compound is melted. This mechanism can be used for example in the field of hardeners or initiators. Furthermore, this mechanism can be used for the field of hair cosmetics.

A further very specific example of product systems according to the invention is configured such that the active ingredient is latent, i.e. is released only after a certain time, but then uniformly over a prolonged period. For this, for example, an active ingredient can be introduced into the carrier material together with the matrix material and then a protective layer according to the invention can be applied. After deactivating the protective layer, the release of the active ingredient then takes place from the matrix material in a diffusion-controlled manner such that uniform release over a prolonged period is ensured.

Suitable compounds for producing the protection system, subsequently also called "protective compounds", are generally known, it being possible to select the particular compound for producing this system according to the intended use and field of application of the product system.

For example, the protective compound can be a low molecular weight, oligomeric or polymeric compound. These include, for example, hydrophilic or polar polymers, in particular polysaccharides, for example cellulose, cellulose derivatives, such as cellulose acetate, methylcellulose, carboxymethylcellulose, crosslinked and uncrosslinked hydroxypropylcellulose, crosslinked and uncrosslinked polyhydroxypropylmethylcellulose, starch or starch derivatives, for example hydroxyalkyl starch, carboxymethyl starch, crosslinked and uncrosslinked sodium cellulose xanthogenates, polyvinyl alcohols, polymethacrylates, in particular polymethyl methacrylates, methacylate/divinylbenzene copolymers, potassium methacrylates/divinylbenzene copolymers, carboxymethylamide, polyoxyalkylene glycols, crosslinked and uncrosslinked polyvinylpyrrolidones, polyoxyethylene glycols and polyvinyl alcohols.

Furthermore, at least one low molecular weight, hydrophilic compound can be used for producing the protection system.

Furthermore, the protective compound may be a hydrophobic substance. These include, among alkylcellulose polymers which can be used in the form of latex suspensions, such as, for example, Surelease® (Colorcon GmbH, Germany), or cellulose acetate phthalate (Aquacoat® CPD; FMC, Germany) or methacrylic acid derivatives which can be used inter alia in the form of suspensions such as Eudragit® RS, RL and NE (Rohm Pharma, Germany).

Moreover, waxes can also be used as protective compound. These include, inter alia, nonionic beeswax derivatives such as Gelucire® 62/05, 50/02 or 50/13 (Gattefossé Deutschland, Germany), glycerol behenate, or other fatty acid mono-, di- or triesters of glycerol such as Precirol® ato 5 (Gattefossé Deutschland, Germany), microcrystalline wax, hydrogenated castor oil or hydrogenated vegetable oil, long-chain aliphatic alcohols, such as stearyl alcohol and carnuba wax.

Furthermore, polyolefins or paraffins may be suitable compounds for producing a protection system. Particularly suitable products are available under the name Sasol Wax®, which can be obtained from Sasol™, where in particular mention is to be made of the grades Sasol Wax® 5403, Sasol Wax® 5413, Sasol Wax® 5603 and Sasol Wax® 4110P.

Protective compounds which exhibit pH dependency include polymers such as, for example, polymethacrylic acid derivatives which can be used in the form of latex suspensions, such as Eudragit® L and S (Röhm Pharma, Germany), Aquacoat® CPD, hydroxypropanol methylcellulose phthalate (HPMCP), polyvinyl acetate phthalate, hydroxypropanol methylcellulose acetate succinate, shellac, cellulose acetate trimellitate, carboxymethylcellulose, copolymers of maleic acid and phthalic acid derivatives, and also mixtures thereof.

Moreover, the protective compounds can in part comprise acid-soluble constituents, for example in the form of the polymers, in particular polyvinylpyrroldone, hydroxypropanolcellulose, hydroxypropanolmethylcellulose, polyethylene glycol, polyvinyl alcohol, or in the form of low molecular weight substances, sugars, salts or organic acids and mixtures of these substances.

Furthermore, surfactants and/or emulsifiers can be used in order to produce a protection system. These include in particular carboxylic acids and carboxylic acid derivatives, such as esters or amides of carboxylic acids which have 6 to 40, preferably 8 to 30, carbon atoms in the acid radical. Preferred carboxylic acids include, inter alia, caprylic acid, capric acid, lauric acid, myristic acid, palmitic acid, margaric acid, arachic acid, behenic acid, lignoceric acid, cerotic acid, palmitoleic acid, stearic acid, oleic acid, elaidic acid, petroselic acid, ricinolic acid, elaeostearic acid, linolic acid, linolenic acid, eicosanoic acid, gadoleic acid, docosanoic acid or erucasic acid.

The protection system of the product according to the invention can have one or more layers of protective compounds. For example, a second protective compound can be applied to the first protective compound. Moreover, the composition of the protective compounds in a protection system can be modified in order to obtain a layered structure.

A particularly preferred protection system can have a layered structure. Here, the layered protection system can have, for example, a first layer, directed to the core, which comprises a hydrophobic first protective compound, for example a paraffin wax, and a second protective layer, directed outwardly, which comprises e.g. a surfactant as protective compound.

The product systems according to the invention can be produced by introducing an active ingredient into a porous carrier and producing a protection system.

Here, the following steps are preferably carried out
a) introduction as initial charge of at least one carrier material in a solids mixing unit
b) optional evacuation of the solids mixing unit
c) optional preimpregnation of the carrier material with at least one protective substance until at most 50% by weight of the DBP absorption value is achieved addition of at least one active ingredient to the solids mixing unit
e) impregnation of the carrier with active ingredient
f) optional inhibition of the active ingredient adhering to the outer particle surface of the carrier material and/or washing and/or drying
g) addition of at least one protective substance
h) impregnation of the carrier with at least one protective substance
i) optional washing and/or drying optional reactive inhibition of the active ingredient adhering to the external particle surface of the carrier material and/or washing and/or drying.

The solids mixing unit used in step a) may be for example: kneaders, paddle driers, tumble mixers, vertical mixers, paddle mixers, Schugi mixers, cement mixers, Gericke continuous mixers, Eirich mixers and/or silo mixers. The temperature in the mixing unit is preferably between 5° C. and 250° C., particularly preferably between 60° C. and 140° C., depending on the protection system and the active ingredient.

Step b) is optional, i.e. does not necessarily have to be carried out. However, evacuating the solids mixing unit after adding the carrier material, the pores of the carrier material can be evacuated and the gas or air present therein can be drawn out, so that more complete loading of the carrier material with active ingredient(s) and protective substance(s) can be achieved.

Step c) is likewise optional and is carried out depending on the pore structure of the carrier material. As already stressed several times, it is important for the effectiveness of the protection system according to the invention that the pores are closed as completely as possible with protective substances to the outside so that the active ingredient is protected against contact with solvents. In most porous carrier materials, the pores are joined together in a more or less complex system. Consequently, it is possible that narrow pores into which neither active ingredient nor protective substance, e.g. on account of the viscosity, can penetrate, but likely solvents, inside of the carrier material, have a connection to a pore into which the active ingredient has penetrated. In this way, the case could arise that although the active ingredient cannot be removed from the actual pore into which it has soaked, as a result of the smaller "secondary pores", solvent comes into contact with the active ingredient inside of the carrier and thus some active ingredient is nevertheless removed. As a result of a preimpregnation of the carrier material with the protection system, such undesired effects can be avoided since as a result these "side channels" can be closed before the active ingredient is absorbed. In particularly preferred embodiments, protective substance is introduced in the form of a solution or as melt.

In step d), the active ingredient or a plurality of active ingredients is added to the solids mixing unit. If a plurality of active ingredients is to be added, these can be added simultaneously or in succession. The active ingredients can, if liquid, be added directly, or are added as melt or else also as solution or in the form of a dispersion or a suspension.

In step e), the active ingredient/active ingredients are introduced into the carrier material or the preimpregnated carrier material. Here, the mixing time/incorporation time is designed such that complete penetration of the active ingredients into the pores is ensured. Impregnation with an active ingredient is terminated when the pourability of the product measured using the flow funnels in accordance with DIN 53492 has the value 1. In one particularly preferred embodiment, the active ingredient is broken up in a solvent, the solution is introduced into the carrier and the product obtained in this way is dried in order to remove the solvent.

For many fields of application, it is important that the active ingredients can actually only develop their effect at a certain time, i.e. in such cases, no kind of active ingredient must come into contact with a reactant prematurely. However, since during the impregnation in step e), i.e. during the soaking of the active ingredient into the pores, it is usually not possible to prevent at least a few active ingredient molecules adhering to the outer carrier surface, it may, depending on the field of application, be useful to inhibit these active ingredient molecules in an optional step f) or to remove them from the outer carrier surface by washing in order to ensure that active ingredient is actually present only in the pores. In the case of inhibition, active ingredient present on the surface is reacted to give an unreactive substance by virtue of a corresponding reactant. In the case of washing, the active ingredient is washed away using a suitable solvent. Depending on the active ingredient, several washing operations are necessary. If the intention were to introduce the active ingredient/active ingredients in the form of a solution or suspension, then the solvent is preferably removed prior to adding the protective substance, preferably by evacuation or heating.

In step g), the protective substance or a plurality of protective substances is added to the solids mixing unit. If a plurality of protective substances are to be added, these can be added simultaneously or in succession. The protective substances can, if liquid, be added directly, or be added as melt or else also as solution or in the form of a dispersion or a suspension. In particularly preferred embodiments, protective substance is introduced in the form of a solution or as melt. In step h), it must be ensured that the pores are filled as completely as possible since the pores which lead from the surface to the core of the carrier particle are joined together by interpore channels which transmit solvents and could thus bring about release of the active ingredient.

If the protective substance/protective substances are to have been added in the form of a solution or suspension, then preferably the solvent is removed particularly preferably by evacuation or heating.

In order to remove excess protective substance, it is possible, where necessary, for a washing step with subsequent drying to take place in step i).

Depending on the active ingredient and protection system, it may be useful, instead of the inhibition or the washing off of the active ingredient adhering to the outer carrier surface in step f), to carry out this inhibition or this washing operation after applying the protective layer, i.e. in step j). As a rule, it will be more effective to carry out the washing or inhibition in step j) instead of step f) since in step g) the pores have been closed by the protective substance and thus in step j) only the active ingredient molecules adhering to the outer surface are eliminated. It is also possible to wash and/or inhibit both in step f) and also in step j). It is also possible both to wash and also to inhibit in step f) and/or j).

In specific cases, stages b) to e) and/or g) to h) are carried out several times, in which case, upon repeating steps d) and e) and/or g) and h), in each case identical or different active ingredients and/or protective substances can be used. In addition, it is advantageous to select the protective substance or the active ingredient in steps c), d), e), g) and h) the mixing conditions in such a way that the active ingredient or protective substance always remains liquid and does not dry out or crystallize out on the surface of the particles.

In one particular embodiment of the method according to the invention, step d) is not carried out after step a), but before, i.e. the carrier material and the active ingredient/active ingredients are mixed before they are poured into the solids mixing unit. Particular advantages in this case are in the uniformity of the active ingredient distribution within the carrier particles. This is very important in the case of high active ingredient loading in particular in the range 60 to 80% of the DBP value) in order then to be able to load all particles uniformly with the protection system.

In a further particular variant of the method according to the invention, a pretreatment of the carrier material with surfactants or with silanes can take place before the active ingredient and/or protection system is added. This can lead firstly to a hydrophobization of the carrier, as a result of which—depending on the polarity of the carrier, is possible that it is made easier for the active ingredient(s) to penetrate deeply into the pores. Secondly, as a result, however, is also possible to achieve closure of ultrafine pores, which is desirable since undesired, rapid release of active ingredient can thereby be prevented.

In principle, it is also possible to carry out steps c) and d) simultaneously and to add a mixture of at least one active ingredient and at least one protective substance. This may be particularly useful if the protective substance can penetrate into smaller pores than the active ingredient and thus the effect described above, i.e. the "sealing" of side pores is also possible in the event of simultaneous incorporation of protective substance and active ingredient.

In order to ensure the functionality of the product systems according to the invention, in particular the mechanical stability, it is necessary that firstly no active ingredient is present on the carrier surface, but secondly also that as far as possible no protective substance is present on the outer carrier surface. Ideally, both components should be completely soaked into the pores of the carrier material. In order to achieve this, the added amount of protective substance/protective substances in step g) should be regulated such that the total amount of active ingredient/active ingredients plus protective substance/protective substances which is added during the production of the product systems corresponds to 50% to 100% of the DBP absorption value (according to DIN 53601) of the carrier material.

Alternatively, the production process can, however, also be controlled via the pore volume; in this case, the added amount of protective substance/protective substances in step g) is preferably regulated such that the total amount of active ingredient/active ingredients and protective substance/protective substances which is added during the production of the product systems is greater than the total pore volume of the carrier material and that the excess of protective substance/protective substances is absorbed by adding carrier material and/or carrier material laden with active ingredient/active ingredients.

The mixing intensities and the dosage in the method according to the invention should be matched to one another such that pourability at the end of the application process is ensured, i.e. that a pourable powder is present in the mixer at any time. Consequently, it can be ensured that the protective substance and/or active ingredient is completely absorbed into the pores and does not adhere to the outer carrier surface. If dosing is too rapid or if mixing is not intensive enough, the result may be uneven loadings of the particles, which can ultimately lead to the pores of some particles being filled completely with active ingredient and a protective substance can no longer penetrate in and thus no latency can be achieved. In this connection, it should also be ensured that the stirring elements, e.g. IKA Duplex stirring element in the measurement kneader H60, are chosen such that no abrasion takes place as a result of shear stress. The checking for abrasion on the particles takes place by measuring the particle size distribution. For this, the carrier materials are introduced into the mixing unit used subsequently and the mixing operation is started corresponding to the subsequent procedure. After a defined mixing time, samples are taken and the particle size distribution is determined. For the particle size distribution, the deviation from the $d_{50}$ value of the starting sample should not be greater than 5%. If, for example, the result of the particle size distribution before mixing is:

Average particle size $d_{50}$=23.72 μm and the result of the particle size distribution after mixing is:

Average particle size $d_{50}$=22.74 μm, then this condition is satisfied.

Conventional methods in which a large amount of coating composition is added rapidly to the carrier material have the disadvantage that they may lead to gas inclusions in the pores, i.e. that the pores are not filled as desired with active ingredient, but with gas.

The present product systems can be used in many products. These include in particular cosmetics, medicaments, deodorants, foods, construction materials, agrochemicals, adhesives, packagings and/or coating systems.

The present invention is explained in more detail below by reference to examples, without any imitation being intended as a result.

FIG. 1: Principle of x-ray photoelectron spectrometry XPS/ESCA.

FIG. 2: XPS/ESCA spectrum for trifluoroacetic acid

FIG. 3: XPS overview spectrum for Sipernat 50 laden with 20% by weight of 2-Mi, produced by the method according to the invention.

Figure 4:
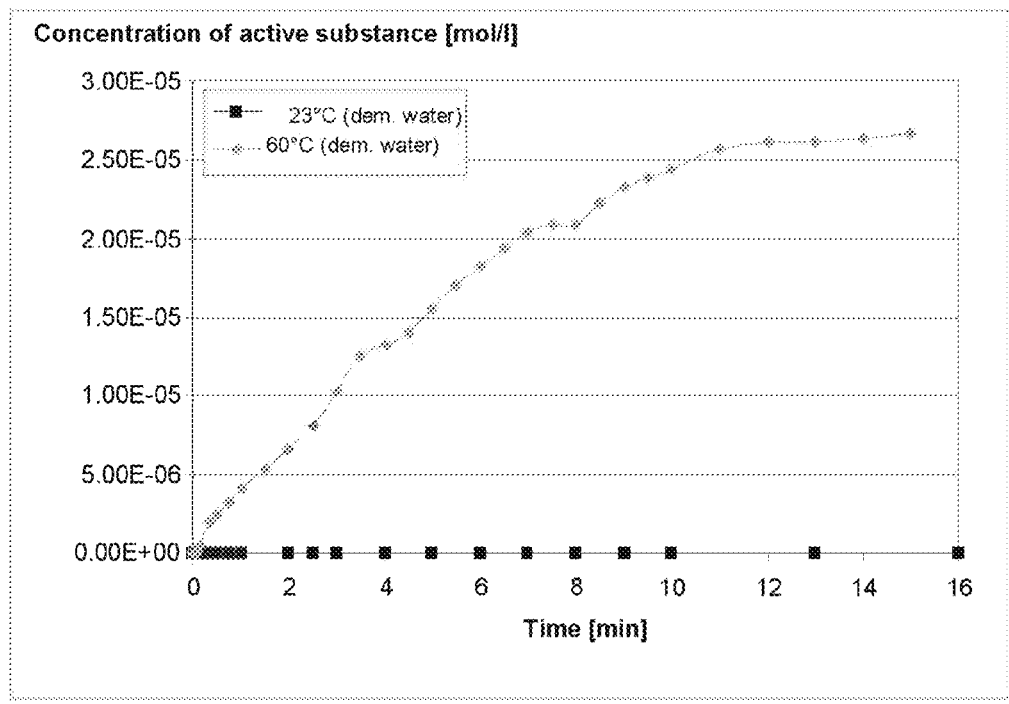

FIG. 4: Release kinetics of product systems according to the invention with sodium hydroxide solution as active ingredient at various temperatures.

MEASUREMENT METHODS

Determination of the DBP Number:

The DBP absorption (DBP number), which is a measure of the absorptivity of a porous carrier material is determined as follows in accordance with the standard DIN 53601:

12.50 g of pulverant or spherical carrier material with 0-10% moisture content (if necessary the moisture content is adjusted by drying at 105° C. in the drying cabinet) are added to the kneader chamber (article number 279061) of the Brabender absorptometer "E" (without damping the starting filter of the torque sensor). In the case of granules, the sieve fraction from 3.15 to 1 mm (stainless steel sieve from Retsch) is used (by gently pressing the granules through the sieve with a pore width of 3.15 mm using a plastic spatula.). With continuous stirring (rotational speed of the kneader blades 125 rpm), dibutyl phthalate is added dropwise to the mixture at a rate of 4 ml/min at room temperature through the "Dosimaten Brabender T 90/50". Mixing in takes place only with low power consumption and is monitored using the digital display. Toward the end of the determination, the mixture becomes pasty, which is indicated by means of a steep increase in the power consumption. When 600 digits are displayed (torque of 0.6 Nm) both the kneader and also the DBP metering are switched off via an electrical contact. The synchronous motor for the introduction of DBP is coupled to a digital counter so that the consumption of DBP can be read off in ml.

The DBP absorption is given in the unit [g/(100 g)] without decimal places and calculated using the following formula:

$$DPB = \frac{V*D*100}{E} * \frac{g}{100\ g} + K$$

where DBP=DBP absorption in g/(100 g)
V=consumption of DBP in ml
D=density of DBP in g/ml (1.047 g/ml at 20° C.)
E=initial weight of silica in g
K=correction factor according to moisture correction table in g/(100 g)

The DBP absorption is defined for the anhydrous, dried carrier materials. When using moist carrier materials, in particular precipitated silicas or silica gels, the correction factor K should be taken into consideration for calculating the DBP absorption. This value can be ascertained by reference to the following correction table e.g. a water content of the carrier material of 5.8% would mean an addition of 33 g/(100 g) for the DBP absorption. The moisture of the carrier material is determined according to the method described below "Determination of the moisture and/or the drying loss".

TABLE 1

Moisture correction table for dibutyl phthalate absorption-anhydrous-

| % Moisture | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Moisture or of the Drying Loss

The moisture or else drying loss (TV) of carrier materials is determined in accordance with ISO 787-2 after drying for 2 hours at 105° C. This drying loss consists predominantly of water moisture.

Procedure

In a dry weighing glass with ground cover (diameter 8 cm, height 3 cm), 10 g of the pulverant, spherical or granular carrier material are weighed in to precisely 0.1 mg (initial weight E). The sample is dried with an opened cover for 2 h at 105±2° C. in a drying cabinet. The weighing glass is then closed and cooled to room temperature in a drying cabinet with silica gel as drying agent.

The weighing glass/beaker is weighed precisely to 0.1 mg on a precision balance in order to determine the final weight A. The moisture (TV) is determined in I in accordance with $$TV=(1-A/E)*100,$$

where A=final weight in g and E=initial weight in g.

Average Particle Size $d_{50}$

The particle distribution of the product systems according to the invention is determined by the principle of laser diffraction on a laser diffrometer (Horiba, LA-920).

To determine the particle size of powders, a dispersion with a weight fraction of ca. 1% by weight of $SiO_2$ is prepared by stirring the powder into water.

Directly after the dispersion, the particle size distribution of a part sample of the dispersion is determined using the laser diffrometer (Horiba LA-920). For the measurement, a relative refractive index of 1.09 should be chosen. All measurements are carried out at room temperature. The particle size distribution and also the relevant parameters e.g. the average particle size $d_{50}$ are automatically calculated and depicted graphically by the instrument. The comments in the operating instruction should be observed.

Investigating the Surface Composition by Means of XPS

Measurement Principle

Under ultrahigh vacuum conditions, a material surface is bombarded with soft X-ray radiation (e.g. MgKα). This detaches so-called photoelectrons, the kinetic energy of which, after they have left the material surface, is analyzed using an electron spectrometer (FIG. 1).

When measuring a metallic sample which is in electrically conductive contact with the spectrometer, then the following applies for the kinetic energy of the detached photoelectrons:

$$E_{kin.} = h\nu - E_B - \phi_{Sp'}$$

i.e. the energy of the irradiated X-ray radiation (hv) minus the binding energy (EB) minus the work function of the spectrometer (φSp'). In the case of electrically nonconductive materials, contributions are additionally to be taken into consideration.

From this balance between the excitation energy and the measured kinetic energy it is thus possible to ascertain the binding energy of the electrons to the sample atoms. This depends directly on the chemical bonding state of the elements. Thus, for example, for metallic platinum on a carrier, a different value is measured than for di- or tetravalent platinum. Sulfate-sulfur produces different values to sulfide-sulfur or sulfane-sulfur and PMMA produces different oxygen and carbon signals to polycarbonate, polyoxymethylene or Teflon. A classic example of an XPS result can be found in FIG. 2. It is clear that even different bonding states of the carbon in ethyl trifluoroacetate can be identified by reference to the "chemical shift" of the C signals. By reference to the so-called "chemical shift" of the XPS signals it is thus possible to differentiate different bonded atoms from one another, as a result of which it is possible to establish how large the fraction of carrier atoms or active ingredient atoms or protective substance atoms is on the surface of the product systems according to the invention. On account of the possibility of being able to differentiate differently bonded atoms from one another, the name "ESCA" (electron spectroscopy for chemical analysis) was coined by K. Siegbahn for this measurement method since chemical information is generated.

Using XPS spectra it can be determined which elements are present in which concentration in the region of the uppermost atomic layer of materials, and using the "chemical shift" of the XPS signals, in which chemical bonding state they are present.

By means of EDP-supported evaluation method, this can be Quantified with good reproducibility. The values determined herein usually correspond to a figure in area percent.

By reference to overview surface analyses it is possible to integrally record e.g. 0.5 cm² of a surface, although the penetration depth of the analysis is limited to the uppermost atomic layers. In this way, any microinhomogenities that are present are discovered.

Measurement of the photoelectrons emitted from the sample, as takes place during the XPS/ESCA technique, records exclusively the region of the uppermost atomic layers since the average free path length of these electrons is only a few atomic layers. Electrons which are released by ionization processes in deeper layers are no longer able to reach the surface and thus do not leave the sample.

Consequently, when using soft X-ray excitation radiation and when measuring the low-energy photoelectrons detached thereby, the XPS technique is automatically surface-specific and focused on the surface properties of materials.

A further advantage of XPS is that—apart from hydrogen and helium, also light elements such as B, C, N, O can be detected quantitatively and their chemical binding states can be observed directly.

FIG. 3 shows a XPS overview spectrum of Sipernat® 50 laden with 20% by weight of 2-Mi in accordance with the method according to the invention. It can clearly be seen which part of the surface is formed by $SiO_2$ and which is formed by 2-Mi. By means of substrate subtraction and use of relative sensitivity factors for the elements it is possible to formulate herefrom, in accordance with standardized methods, quantitative statements relating to the surface composition.

Carrying Out the XPS Measurements

The XPS measurements are carried out on powder beds, where in each case 0.5 square centimeters are integrally recorded. In order to avoid contaminations of the samples and measurement artifacts, the samples are for this purpose introduced into a gold-coated highest-purity tantalum sample container (Alfa, 99.98%, ca. 0.25 mm thickness, ca. 1.5 to 2 cm large) in such a way as not to result in any clumping, caking or compacting of the samples. The amount of sample is chosen such that the holder is largely filled or an area of at least 0.5 square centimeters can be measured. Each sample is then transferred to a prechamber of the XPS spectrometer (XPS plant Leybold LHS12 or Leybold MAX 100) and the chamber is evacuated to $10^{-8}$ mbar for ca. 2 hours at room temperature. The sample to be investigated is then transferred to the main chamber of the XPS spectrometer and the vacuum is increased to $4 \times 10^{-10}$ mbar in order to prevent impurities and measurement artifacts due to possible hydrocarbon contaminations or cross contaminations. The purity of the vacuum or of the residual gas in the measurement chamber of the XPS spectrometer is continuously monitored using a residual gas mass spectrometer (Quadrex 200, Inficon).

The XPS measurements were carried out according to the ESCA method using MgKα radiation with an energy of 150 W. The analyzer of the electron energy (Leybold EA200) is operated at a transmission energy of 72 e.V. in the "fixed analyzer transmission mode". The reference used for the bonding energy scale of the spectrometer was the $Au_4f_{7/2}$ signal of the SCAA83 standard from the National Physics Laboratory (NPL, Teddington, GB) at 84 e.V. which is measured before and after measuring the sample to be investigated. The electrostatic charge of the samples to be investigated is compensated by electrons with a low energy from a controlled incandescent electron source which is attached in the vicinity of the sample holder. This emission source in turn is shielded and thermally insulated in order to prevent direct heat transfer to the sample to be investigated.

The evaluation was carried out according the general recommendations of DIN Technical Report No. 39 and the report of the National Physics Laboratory DMAA(A) 97, Teddington, GB, January 1987 and the findings to date of the "Surface and Micro Range Analyses" working committee NMP816 (DIN). A DS 100 data record was used in order to evaluate the XPS data by means of standard routines (with subtraction of the X-ray satellites and the background, and also taking into consideration the relative sensitivity factors valid for the spectrometer used (which are stored in the data system of the spectrometer) of the electron level reported in each case). All data are in area percent.

The examples below serve to illustrate and explain the present invention, but do not limit it in any way.

EXAMPLE 1 a) Introducing the Active Ingredient into a Porous Carrier

The carrier material, for example porous $SiO_2$ (e.g. Sipernat®2200 Degussa) is introduced as initial charge in a glass vessel. The liquid active ingredient is placed into the beaker (ratio e.g. 30% by weight of $SiO_2$ to 70% by weight of liquid active ingredient). The agglomerated particles are mixed in a Turbula mixer for ca. 30 min until the particles are pourable again. As a result of the input of energy and the adsorption and/or capillary forces within the porous $SiO_2$ structure, the active ingredient is transported to the center of the carrier. It is likewise possible to dissolve a nonliquid active ingredient in a corresponding solvent and then to proceed as described above. In order to adjust the active ingredient concentration, the process can be repeated as often as desired, or solutions with corresponding concentrations can be prepared. However, a drying step must be carried out between the steps in order to separate off the solvent. Precise details are given under experimental description c).

b) Production of a Protection System in the Carrier Laden With Active Ingredient The supported material is immersed into a solution of wax and solvent. It is advantageous to select a solvent which does not dissolve the active ingredient. Preferably, the solution is saturated with wax in order to achieve the highest possible entry into the porous carrier. The supported particles are gently stirred for ca. 2 min in the solution before the particles are separated off again via a filter. After briefly draining off, the particles are dried in the oven. For this, a temperature below the melting temperature of the wax and also below the boiling point of the solvent is chosen. The drying can be carried out under the aforementioned conditions also in vacuo. After the Particles have been completely dried, the operation is repeated three times so that at the end four layers of wax have been applied.

It is likewise possible to apply a thick wax layer over a wax melt. Here, the active ingredient should be stable in the melting range of the wax. The supported material can be heated, for example, to 10 K above the melting temperature of the wax. At the same time, the capsule material can be melted. The heated supported material can be introduced as initial charge in a beaker and supplied with the wax melt, for example in the ratio 60:40 (% by weight). The material is then preferably mixed above the melting temperature for a time which is sufficiently long for the particles to be pourable again. The particles are then cooled with mixing at ca. 5° C. depending on the encapsulation material.

Finally, a layer of stearic acid can be applied. For this, the procedure is as described above. The stearic acid is dissolved in solvent which does not partly dissolve the layers applied beforehand. The particles are immersed into the saturated solution for 2 min and then dried.

c) Experimental Description

An encapsulation of NaOH was achieved in accordance with the general production procedure described above with the following experimental steps:

1. 150 ml of a 10% by weight solution of solid NaOH in ethanol was applied to 50 g of $SiO_2$ (Sipernat® 2200).
2. The laden particles were dried at 80° C. in the drying cabinet for 12 hours.
3.-6. Points 1 and 2 were repeated two more times in order to increase the overall loading of the active substance.
7. The particles obtained according to step 6 were immersed into a 25 percent strength solution of wax (Sasol 5403) in n-hexane for two minutes.
8. The drying was then carried out at a temperature of 50° C. and 500 mbar vacuum in the drying cabinet.
9.-12. Points 7 and 8 were repeated two more times.
13. Next, the particles were heated to 80° C., mixed with a stearic acid melt (35 g of stearic acid melt per 100 g of particles) and then solidified in order to be able to produce a flowable product.
14. Finally, the particles were immersed into a solution of 10% by weight of stearic acid in ethanol for 2 minutes.
15. The drying was carried out at 50° C. and 500 mbar vacuum in the drying cabinet.

The product was packaged in glass bottles.
Substances Used:

| | |
|---|---|
| 1. NaOH (solid) | Merck CAS No.: 1310-73-2 |
| 2. n-hexane (technical-grade) | Merck CAS No.: 110-54-3 |
| 3. Ethanol (technical grade) | Merck CAS No.: 64-17-5 |
| 4. Stearic acid | Merck CAS No.: 57-11-4 |
| 5. Sasol 5403 | Sasol CAS No.: 8002-74-2 |
| 6. Carrier material Sipernat ® 2200 | Degussa |

EXAMPLE 2

In order to investigate the stability of the product from example 1, the product was stirred in a jacketed 1 l glass laboratory reactor in water at 23° C. or 40° C. using a laboratory propeller stirrer (200 revolutions/min). After 90 minutes, there was no change in the pH. However, if the temperature is increased above 54° C.—the protection system is designed such that it is opened at 54'C, then the active ingredient is released. FIG. 2 shows the concentration of the active substance in water as a function of the time and the water temperature. For the purposes of clarity, the curve for the release experiment at 40° C. has not been shown. The results of the release experiments clearly indicate the performance of the formulations according to the invention. As a result of the extremely good solubility, of sodium hydroxide solution in water, even small openings or sites of damage in the protection system would mean that the sodium hydroxide solution is released. This is not the case for the product systems according to the invention, as the storage experiments at 23 and 40° C. show. However, if the temperature is increased to 60° C., then the sodium hydroxide solution is released. The product systems according to example 1 thus exhibit good storage stability, good mechanical stability (was simulated by stirring for 90 minutes) and the active ingredient can be released in a targeted manner, controllable by external influences.

EXAMPLE 3

The test sample chosen for example 3 was 2-methylimidazole (CAS No. 693-98-1) (2-Mi). 2-Mi is a heterocyclic compound with two nitrogen atoms and two double bonds with a molecular formula $C_4H_6N_2$. This substance is used as reaction initiator for epoxy resin systems)(Dyhard®). The challenge was to develop an encapsulation formulation in which the initiator is protected against uncontrolled reaction, where methylimidazole is known as a very reactive substance. The release should take place at temperatures above 80° C., at which the epoxy resin curing is started. Below this temperature, no reaction must take place and the reactive substance must not escape from the encapsulated particles. It is known that 2-Mi is very readily soluble in a multitude of organic solvents, including water.

The solids carrier used was Sipernat® 50 from Evonik Degussa GmbH. The encapsulation can be carried out in principle by 2 different variants:

In variant a), the carrier material is introduced as initial charge in a mixer and heated to the melting temperature of the active ingredient. The active ingredient is then added. The 2-Mi is melted in the mixing unit and introduced homogeneously into the carrier material by the mixing operation. In variant b), the 2-Mi is applied from the solution. For this, the carrier material is likewise introduced in the kneader as initial charge, but the kneader is not heated. The 2-Mi is dissolved in a corresponding solvent—as regards the selection of the corresponding solvent, see explanations in the description—and then fed to the mixing unit with the carrier material.

In both process variants, the active ingredient is applied to the carrier material by atomization.

It has been observed that application from the melt achieves a higher loading of the particles.

Following the general—above-described—principles, an encapsulation of 2-Mi according to variant a) was carried out as follows:

1. 50 g of Sipernat® 50 are introduced as initial charge in a kneader and heated to 170° C. with mixing in the apparatus and constantly further stirred.
2. In a beaker, 80 g of 2-Mi are melted with stirring at 150° C. using a hotplate.
3. With constant stirring, the molten 2-Mi of the initial charge is slowly metered into the kneader by adding dropwise. Here, 60 g of 2-Mi are metered in over 30 min (dropwise addition),
4. The mixture is kneaded at 170° C. for 60 min. This gives a pourable intermediate.
5. The temperature in the kneader is then reduced to 100° C.
6. In a beaker, 140 g of wax C80 is melted at 90° C.
7. The wax is added dropwise to the mixture over 60 min.
8. The mixture is kneaded at 100° C. for 60 min. This gives a pourable intermediate.
9. The temperature in the kneader is then reduced to 80° C.
10. In a beaker, 70 g of stearic acid are melted at 70° C.
11. The stearic acid is added dropwise to the mixture over 30 min. This gives a viscous mass.
12. In a drying cabinet, 50 g of Sipernae® 50 are heated to 80° C.
13. The Sipernat® from 12. is metered into the mixture from step 11 (spoonwise addition)
14. The mixture is kneaded at 80° C. for 60 min. This gives a pourable product.
15. The kneader is cooled to room temperature and the finished product is removed and packaged in a glass bottle.

Substances Used:

| | |
|---|---|
| 1. 2-Methylimidazole | Merck CAS No.: 693-98-1 |
| 2. Wax | Sasol Name C80 |
| 3. Stearic acid | Merck CAS No.: 57-11-4 |
| 4. Carrier material Sipernat ® 50 | Evonik |

Instruments Used:

| | |
|---|---|
| 1. Kneader | Manufacturer IKA |
| | Name measurement kneader H60 |
| 2. Magnet stirrer/hotplate | Manufacturer IKA |
| | Name RCT basic |

Selection of the protective material depends primarily on the release conditions. In the above case of the encapsulated 2-Mi, the protective material should have a melting point of more than 80° C. since the release is to take place within this temperature range.

EXAMPLE 4

Production of Product Systems Analogous to Example 3) but With Preimpregnation of the Carrier Material As a variation on example 3, in order to influence the surface properties of the Sipernat® 50, prior to application of the active ingredient, a treatment of the Sipernat® 50 with the surfactant Tego Twin 4000 was carried out. For this, the carrier material was introduced as initial charge in a mixer and the surfactant Tego Twin 4000 was applied preferably in a weight ratio of carrier material to surfactant of 5:1. The protection system is then generated as described in steps 1 to 15 of example 3.

EXAMPLE 5

Production of a Product System Corresponding to Example 3) But with Prior Evacuation of the Carrier Material As a variation of example 3, Sipernae® 50 from Evonik Degussa GmbH was introduced as initial charge in a mixer and heated to the melting temperature of the active ingredient. The 2 Mi is then added to the mixer. The mixing unit was evacuated to 200 mbar abs, the 2-Mi is melted in the mixing unit and homogeneously introduced into the carrier material by the mixing operation. The further steps were carried out as described in example 3.

EXAMPLE 6

The Structure of the Product Systems from Example 3) was Investigated

To characterize the particle structure, XPS surface analyses were carried out on an encapsulated sample (as in example 3) and on an unencapsulated sample of the active ingredient 2-methylimidazole. The measurement was carried out on a powder bed of the sample over an area of 0.5 $cm^2$. Photoelectron spectroscopy XPS gives information about the elemental coating of the particle surface. Table 2 shows the results of the analysis. The figures are in atomic percent. Assuming that the amount of adsorbed carbon is constant at 7% (carbon loading of 7% was ascertained beforehand when measuring the pure carrier material Sipernat® 50 (see table 2 below)), the molecular fractions is inferred from the stated values.

FIG. 3 shows a XPS overview spectrum of Sipernat® 50 laden with 20% by weight, i.e. the product according to stage 4 of the method from example 3. It can clearly be seen, in particular from the N, O and Si peaks, that the 2-Mi has been absorbed almost completely into the pores of the carrier material and only very small amounts have remained on the surface.

The evaluation of the XPS spectra of the end product according to example 3 is given in table 2 below.

TABLE 2

| results of the XPS measurement | | | | | |
|---|---|---|---|---|---|
| $SiO_2$ | C | N | F | Molecular fractions | |
| Pure Sipernat ® 50 before loading | | | | | |
| 92.0% | 6.9% | — | 1.0% | $SiO_2$: | 92.0% |
| Product system according to example 3 | | | | | |
| 16% | 78.9% | 2.4% | 2.8% | $SiO_2$: | 16.0% |
| | | | | 2-Mi: | 7.3% |
| | | | | St/Sasol: | 64.6% |

The results from table 2 above show that 16% of the particle surface in the product system according to example 3 is formed by $SiO_2$. This confirms that the protection system is largely located in the pores of the carrier material and the pore walls made of hard $SiO_2$ extend up to the surface of the product system, where they bring about mechanical abrasion protection. A complete protective shell around the carrier material—as in the case of a "core/shell" system—is clearly not present. In addition, the results indicate that although no inactivation of the active ingredient or separate washing steps were carried out with the product systems according to the invention as in example 3, only 7.3% of 2-Mi are present on the particle surface and thus the majority of the 2-Mi was soaked into the pores of the carrier.

EXAMPLE 7

In this example, the storage stability of resins comprising a hardener and 2-Mi as accelerator was investigated. For this, in one case a 2-Mi encapsulated according to the invention (with 20% by weight active ingredient loading) and in another case pure 2-Mi was incorporated into a mixture of a resin and a hardener and the mixture was investigated theologically in order to measure the hardening of the system. Here, as the viscosity increases, the hardening is more advanced.

TABLE 3 results of the storage experiments of resins with 2-Mi

| Epikote 828 [g] | Starter Dyhard 100S [mg] | Accelerator 2-Mi | Amount[1] of accelerator formulation [mg] | Note | \multicolumn{7}{c}{Viscosity in Pa·s (measured at 25° C.)} |
|---|---|---|---|---|---|---|---|---|---|---|---|
| | | | | | 0 Days | 1 Day | 2 Days | 3 Days | 4 Days | 5 Days | 6 Days |
| 5 | 86 | Encapsulated in product system according to the invention with 20% by weight of 2-Mi | 70 | Storage at T = 20° C. | 20 | — | — | 30 | Weekend | Weekend | 55 |
| 5 | 86 | Pure 2-Mi | 14 | Storage at T = 20° C. | 19 | 49 | 119 | — | — | solid | — |

| Epikote 828 [g] | Starter Dyhard 100S [mg] | Accelerator 2-Mi | Amount[1] of accelerator formulation [mg] | Note | \multicolumn{7}{c}{Continuation of viscosity in Pa·s (measured at 25° C.)} |
|---|---|---|---|---|---|---|---|---|---|---|---|
| | | | | | 7 Days | 8 Days | 9 Days | 10 Days | 11 Days | 12 Day | 13 Day |
| 5 | 86 | Encapsulated in product system according to the invention with 20% by weight of 2-Mi | 70 | Storage at T = 20° C. | 73 | 109 | 190 | 323 | Weekend | Weekend | . |
| 5 | 86 | Pure 2-Mi | 14 | Storage at T = 20° C. | — | — | — | — | — | — | — |

| Epikote 828 [g] | Starter Dyhard 100S [mg] | Accelerator 2-Mi | Amount[1] of accelerator formulation [mg] | Note | \multicolumn{7}{c}{Continuation of viscosity in Pa·s (measured at 25° C.)} |
|---|---|---|---|---|---|---|---|---|---|---|---|
| | | | | | 14 Days | 15 Days | 16 Days | 17 Days | 18 Days | 19 Days | 20 Days |
| 5 | 86 | Encapsulated in product system according to the invention with 20% by weight of 2-Mi | 70 | Storage at T = 20° C. | 410 | — | — | 560 | Weekend | Weekend | 740 |
| 5 | 86 | Pure 2-Mi | 14 | Storage at T = 20° C. | — | — | — | — | — | — | — |

[1] Since the product systems according to the invention were laden with 20% by weight of 2-Mi and the absolute amount of 2-Mi in both experimental series should be identical, for the experiment, 5 times the amount of product system according to the invention compared to pure 2-Mi was used.

As can be seen from table 3 above, the resin comprising pure 2-Mi has already completely hardened after 5 days and is no longer processable. However, when using the product systems according to the invention, even after 8 days, the viscosity is still better than when using pure 2-Mi. Even after a storage time of 3 weeks, the resin comprising the product systems according to the invention is still liquid and can still be processed. Consequently, the processing time was more than quadrupled. A further advantage is that, after 3 weeks and after processing the resin, the protection system can be destroyed through targeted activation and therefore the 2-Mi can be rapidly released.

The invention claimed is:

1. A product system comprising
at least one porous carrier, wherein the porous carrier is inorganic, organic, or a combination thereof,
at least one active ingredient which is introduced into the porous carrier, and
at least one protective substance, wherein at least part of the total amount of the at least one protective substance present in the product system is introduced in the pores of the porous carrier, wherein the at least one protective substance can be deactivated in a targeted manner by one or more of an action of pressure waves on the product system, an action of UV radiation on the product system, increasing temperature of the product system, a pH change, and an action of at least one enzyme on the protective substance, wherein when the porous carrier is in an aqueous medium, the at least one protective substance does not allow any of the at least one active ingredient to be released prior to deactivation of the at least one protective substance,
wherein at least 80% by weight of the at least one active ingredient is released within 1 hour when the at least one protective substance is deactivated by an action of pressure waves on the product system,
wherein at least 80% by weight of the at least one active ingredient is released within 12 hours when the at least one protective substance is deactivated by an action of UV radiation on the product system,
wherein at least 60% by weight of the at least one active ingredient is released within 1 hour when the at least one protective substance is deactivated by increasing temperature of the product system,
wherein at least 70% by weight of the at least one active ingredient is released within 8 hours when the at least one protective substance is deactivated by a pH change,
wherein at least 80% by weight of the at least one active ingredient is released within 24 hours when the at least one protective substance is deactivated by an action of at least one enzyme on the protective substance,
and wherein, detected by investigating the outermost atomic layer of the product system by means of XPS, at least part of the outermost surface of the product system is formed by the porous carrier.

2. The product system as claimed in claim 1, wherein at least 10% of the surface of the product system, detected by investigating the outermost atomic layer of the product system by means of XPS, is not formed by the at least one active ingredient, the at least one protective substance, or a combination thereof.

3. The product system as claimed in claim 1, wherein the protective substance comprises at least one compound which is soluble in a solvent in which the at least one active ingredient is not soluble.

4. The product system as claimed in claim 1, wherein the at least one active ingredient is soluble in a polar solvent and the protective substance is insoluble in water, soluble in a nonpolar solvent, or a combination thereof, or wherein the at least one active ingredient is soluble in a nonpolar solvent and the protective substance is insoluble in a nonpolar solvent, soluble in a polar solvent, soluble in water, or a combination thereof.

5. The product system as claimed in claim 4, wherein the nonpolar solvent is an aromatic hydrocarbon, an alkane or a cycloalkane.

6. The product system as claimed in claim 1, wherein the weight ratio of the protective substance to the at least one active ingredient is in the range from 10:1 to 1:10.

7. The product system as claimed in claim 1, wherein the loading of the porous carrier with the at least one active ingredient is 0% by weight to 90% by weight, based on the DBP absorption of the porous carrier.

8. The product system as claimed in claim 1, wherein the loading of the porous carrier with the protective substance is at least 10% by weight, based on the DBP absorption of the porous carrier.

9. The product system as claimed in claim 7, wherein the unladen porous carrier has a DBP absorption of at least 180 g/100 g.

10. The product system as claimed in claim 1, wherein the product system is particulate.

11. The product system as claimed in claim 10, wherein the particles have an average particle size d50 in the range from 5 μm to 1000 μm.

12. A product system comprising
at least one porous carrier, wherein the porous carrier is inorganic, organic, or a combination thereof,
at least one active ingredient which is introduced into the porous carrier, and
at least one further substance, wherein at least part of the total amount of the at least one further substance present in the product system is incorporated in the pores of the porous carrier,
wherein the at least one further substance forms a protection system capable of being deactivated as a result of an input of energy, chemical conversion, breakup of the protection system, or a combination thereof, wherein when the porous carrier is in an aqueous medium, the protection system does not allow any of the at least one active ingredient to be released prior to deactivation of the protection system, and wherein at least 50% by weight of the at least one active ingredient is spontaneously released after deactivation of the protection system; and wherein, detected by investigating the outermost atomic layer of the product system by means of XPS, at least part of the outermost surface of the product system is formed by the porous carrier.

13. The product system as claimed in claim 12, wherein the protection system is designed such that an input of energy through pressure waves, irradiation with UV light, increasing the temperature, or a combination thereof triggers the deactivation of the protection system.

14. The product system as claimed in claim 13, wherein an input of energy through pressure waves triggers the release of at least 80% by weight of the at least one active ingredient within 1 h.

15. The product system as claimed in claim 13, wherein irradiation with UV light triggers the release of at least 80% by weight of the at least one active ingredient within 12 h.

16. The product system as claimed in claim 13, wherein increasing the temperature triggers the release of at least 60% by weight of the at least one active ingredient within 60 min.

17. The product system as claimed in claim 12, wherein the protection system is designed such that a chemical conversion, pH shift, action of at least one enzyme, or a combination thereof triggers the deactivation of the protection system.

18. The product system as claimed in claim 17, wherein a pH shift triggers the release of at least 70% of the at least one active ingredient within 8 h.

19. The product system as claimed in claim 17, wherein the action of at least one enzyme triggers the release of at least 80% by weight of the at least one active ingredient within 24 h.

20. The product system as claimed in claim 12, wherein contacting the protection system with a suitable solvent triggers the release of at least 80% by weight of the at least one active ingredient over the course of 24 hours.

21. The product system as claimed in claim 12, wherein at least 80% by weight of the at least one active ingredient is released in a diffusion-controlled manner within 20 days after deactivation of the protection system.

22. A method for producing a product system as claimed in claim 12, wherein at least one active ingredient is introduced into a porous carrier and a protection system is produced.

23. The method as claimed in claim 22, comprising the following steps:
    a) introduction as initial charge of at least one porous carrier in a solids mixing unit
    b) optional evacuation of the solids mixing unit
    c) optional preimpregnation of the porous carrier with at least one protective substance until at most 50% by weight of the DBP absorption value is achieved
    d) addition of at least one active ingredient to the solids mixing unit
    e) impregnation of the porous carrier with the at least one active ingredient
    f) optional inhibition of the at least one active ingredient adhering to the outer particle surface of the porous carrier, washing, drying, or a combination thereof
    g) addition of at least one protective substance
    h) impregnation of the porous carrier with at least one protective substance
    i) optional washing, drying, or a combination thereof
    j) optional reactive inhibition of the at least one active ingredient adhering to the external particle surface of the porous carrier, washing, drying, or a combination thereof.

24. The method as claimed in claim 23, wherein steps b) to e), steps g) to h), or a combination thereof, are carried out several times, where, in the case of the repetition of steps d) and e), steps g) and h), or a combination thereof, in each case identical or different active ingredients, protective substances, or a combination thereof, are used.

25. The method as claimed in claim 23, wherein the porous carrier and the at least one active ingredient are mixed before being introduced into the solids mixing unit.

26. The method as claimed in claim 23, wherein a pretreatment of the porous carrier with surfactants or silanes takes place before the at least one active ingredient, the at least one protective substance, or a combination thereof are added.

27. The method as claimed in claim 26, wherein, in stage c), a mixture of the at least one active ingredient and the at least one protective substance is added.

28. The method as claimed in claim 22, wherein the added amount of the at least one protective substance in step g) is regulated such that the total amount of the at least one active ingredient and the at least one protective substance which are added during the production of the product system corresponds to 50% by weight to 100% by weight of the DBP absorption value of the porous carrier.

29. The method as claimed in claim 22, wherein the added amount of the at least one protective substance in step g) is regulated such that the total amount of the at least one active ingredient and the at least one protective substance which are added during the production of the product system is greater than the total pore volume of the porous carrier and that the excess of the at least one protective substance is absorbed by adding porous carrier, porous carrier laden with the at least one active ingredient, or a combination thereof.

30. The method as claimed in claim 22, wherein the method is performed at a mixing intensity and a metering which are matched to one another such that the pourability at the end of the method is ensured.

31. The method as claimed in claim 22, wherein the method further comprises stirring elements that are selected such that no abrasion takes place as a result of shear stress.

32. A method of producing an article selected from the group consisting of foods, feeds, medicaments, products for the land and forestry, cosmetics, components for coating formulations, and adhesive formulations or components for sports equipment and sports clothing, comprising incorporating a product system as claimed in claim 12 into the article.

* * * * *